US009729248B2

(12) United States Patent
Kono

(10) Patent No.: US 9,729,248 B2
(45) Date of Patent: Aug. 8, 2017

(54) DEMODULATION METHOD, INFORMATION PROCESS APPARATUS, AND RECEPTION STATION

(71) Applicant: FUJITSU LIMITED, Kawasaki-shi, Kanagawa (JP)

(72) Inventor: Taki Kono, Kodaira (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/268,863

(22) Filed: Sep. 19, 2016

(65) Prior Publication Data
US 2017/0093500 A1 Mar. 30, 2017

(30) Foreign Application Priority Data
Sep. 25, 2015 (JP) ................... 2015-188350

(51) Int. Cl.
*H04B 1/10* (2006.01)
*H04B 10/60* (2013.01)
(Continued)

(52) U.S. Cl.
CPC ............ *H04B 10/60* (2013.01); *H04B 7/02* (2013.01); *H04H 60/00* (2013.01);
(Continued)

(58) Field of Classification Search
CPC ......... H04L 27/00; H04L 27/06; H04L 27/04; H04L 27/156; H04L 27/2649; H04L 27/2653
(Continued)

(56) References Cited

U.S. PATENT DOCUMENTS 6,297,691 B1 * 10/2001 Anderson ........... H04L 27/2273
329/300
6,345,018 B1 * 2/2002 Maegawa ............ G11B 7/0053
369/44.13
(Continued)

FOREIGN PATENT DOCUMENTS

EP 1 303 060 A 4/2003
JP 4-4621 A 1/1992
(Continued)

OTHER PUBLICATIONS

O. Haffenden, et al., "Digital Radio Mondiale (DRM): Multi-Transmitter Networks and Diversity Reception", International Broadcasting Conference, 2004, Sep. 10, 2004, pp. 1-9. Cited in the Extended European Search Report dated Feb. 21, 2017.
(Continued)

*Primary Examiner* — Sonny Trinh
(74) *Attorney, Agent, or Firm* — Westerman, Hattori, Daniels & Adrian, LLP

(57) ABSTRACT

A non-transitory computer-readable recording medium on which a program is recorded for a causing a processor to execute a demodulation process. The demodulation process includes detecting a preamble of a wireless signal transmitted from a first transmission station by way of a short wavelength carrier wave, extracting a first signal superimposed on the short wavelength carrier wave, the first signal being extracted from a wireless signal that is identified in accordance with the detection of the preamble, extracting a second signal superimposed on a carrier wave transmitted from a second transmission station, and performing demodulation on a target demodulation signal obtained by superimposing the first signal on the second signal.

17 Claims, 24 Drawing Sheets

(51) Int. Cl.
  *H04L 5/00* (2006.01)
  *H04B 7/02* (2017.01)
  *H04H 60/00* (2009.01)
  *H04L 7/06* (2006.01)
  *H04L 27/00* (2006.01)

(52) U.S. Cl.
  CPC .............. *H04L 5/0048* (2013.01); *H04L 7/06* (2013.01); *H04L 27/00* (2013.01); *H04H 2201/12* (2013.01)

(58) Field of Classification Search
  USPC .......... 455/21, 293, 309, 312; 329/315, 316, 329/317, 348, 358
  See application file for complete search history.

(56) References Cited

U.S. PATENT DOCUMENTS

| | | | |
|---|---|---|---|
| 6,640,093 B1 | 10/2003 | Wildhagen | |
| 7,426,248 B2* | 9/2008 | Feher | H04B 1/69 375/340 |
| 7,474,881 B2* | 1/2009 | Ito | H04B 7/0871 455/132 |
| 7,729,329 B2* | 6/2010 | Fujita | H04W 74/0816 370/342 |
| 2012/0321012 A1 | 12/2012 | Elenes et al. | |

FOREIGN PATENT DOCUMENTS

| | | |
|---|---|---|
| JP | 2001-44868 A | 2/2001 |
| JP | 2001-196978 A | 7/2001 |
| JP | 2003-234683 A | 8/2003 |
| JP | 2005-333291 A | 12/2005 |
| WO | 2006/134351 A1 | 12/2006 |

OTHER PUBLICATIONS

Nn: "DRM Introduction and Implementation Guide Digital radio mondiale; Revision 2", Sep. 13, 2013, pp. 1-98; Cited in the Extended European Search Report dated Feb. 21, 2017.

Extended European Search Report dated Feb. 21, 2017, issued in counterpart European Patent Application No. 16189430.8. (9 pages).

* cited by examiner

FIG.7

STATION A
/241A

| TIME | FREQUENCY fa1 | FREQUENCY fa2 | FREQUENCY fa3 | FREQUENCY fa4 |
|---|---|---|---|---|
| 8:00 | MARKET INFORMATION | | | |
| 8:30 | | TYPHOON INFORMATION 2 | | WEATHER INFORMATION |
| 9:00 | | OKINAWA WEATHER SEA INFORMATION | MARKET INFORMATION | |
| 9:30 | WEATHER INFORMATION | | | |
| 10:00 | | AREA 1 DANGER INFORMATION | | |
| 10:30 | | | AREA 1 DANGER INFORMATION | |
| 11:00 | | | | |
| 11:30 | | OKINAWA WEATHER SEA INFORMATION | | |
| 12:00 | | | | |
| 12:30 | | TYPHOON INFORMATION 1 | | MARKET INFORMATION |
| 13:00 | | | | |
| 13:30 | | | | |
| 14:00 | | | | |

FIG.8

STATION B
241B

| TIME | FREQUENCY fb1 | FREQUENCY fb2 | FREQUENCY fb3 | FREQUENCY fb4 |
|---|---|---|---|---|
| 8:00 | | | | |
| 8:30 | | | AREA 1 WEATHER SEA INFORMATION | AREA 3 WEATHER SEA INFORMATION |
| 9:00 | | AREA 1 DANGER INFORMATION | | |
| 9:30 | | | AREA 2 DANGER INFORMATION | |
| 10:00 | | | | AREA 3 DANGER INFORMATION |
| 10:30 | WEATHER INFORMATION | | | |
| 11:00 | | TYPHOON INFORMATION 2 | | |
| 11:30 | | | | TYPHOON INFORMATION 1 |
| 12:00 | | | OKINAWA WEATHER SEA INFORMATION | |
| 12:30 | | | | |
| 13:00 | | | | |
| 13:30 | OKINAWA WEATHER SEA INFORMATION | | | |
| 14:00 | TYPHOON INFORMATION 1 | | | |

FIG.9

| TIME | MARKET INFORMATION | OKINAWA WEATHER SEA INFORMATION | TYPHOON INFORMATION 1 | TYPHOON INFORMATION 2 | WEATHER INFORMATION |
|---|---|---|---|---|---|
| 8:00 | fa1 | | | | |
| 8:30 | | | | | fa4 |
| 9:00 | fa3 | | | | |
| 9:30 | | fa2 | | | |
| 10:00 | | | | | fa1 |
| 10:30 | | | | | fb1 |
| 11:00 | | | fb4 | | |
| 11:30 | | fb3 | | | |
| 12:00 | | | | fb2 | |
| 12:30 | fa4 | | | | |
| 13:00 | | fb1 | fa2 | | |
| 13:30 | | | fb1 | | |
| 14:00 | | | | | |

FIG.10

| TYPE OF MESSAGE | STORAGE AREA |
|---|---|
| MARKET INFORMATION | AREA A-1 |
| OKINAWA WEATHER SEA INFORMATION | AREA A-2 |
| TYPHOON INFORMATION 1 | AREA A-3 |

| DATE | 20150320 | 20150320 | 20150321 | 20150321 | 20150321 |
|---|---|---|---|---|---|
| TIME | 1200 | 1500 | 900 | 1500 | 1500 |
| TYPE OF MESSAGE | MARKET | OKINAWA SEA AREA | TYPHOON INFORMATION 1 | TYPHOON INFORMATION 2 | WEATHER INFORMATION |
| RECEPTION STATUS | COMPLETED | COMPLETED | COMPLETED | RECEIVING | WAITING |
| | 0001-COMP | 0001-COMP | 0001-COMP | 0001-COMP | 0001-COMP |
| | 0002-COMP | 0002-COMP | 0002-COMP | 0002-COMP | 0002-COMP |
| | 0003-COMP | 0003-COMP | 0003-COMP | 0003-COMP | 0003-COMP |
| | 0004-COMP | 0004-COMP | 0004-COMP | 0004-COMP | 0004-COMP |
| | 0005-COMP | 0005-COMP | 0005-COMP | 0005-RECV | 0005-COMP |
| | 0006-COMP | 0006-COMP | 0006-COMP | | 0006-COMP |
| | 0007-COMP | 0007-COMP | 0007-COMP | | 0007-COMP |
| | 0008-COMP | 0008-COMP | 0008-COMP | | 0008-COMP |
| | 0009-COMP | ******** | 0009-COMP | | 0009-ERR |
| | 0010-COMP | | 0010-COMP | | 0010-COMP |
| | 0011-COMP | | 0011-COMP | | 0011-COMP |
| | 0012-COMP | | 0012-COMP | | 0012-COMP |
| | 0013-COMP | | 0013-COMP | | 0013-COMP |
| | 0014-COMP | | 0014-COMP | | 0014-COMP |
| | 0015-COMP | | 0015-COMP | | 0015-COMP |
| | 0016-COMP | | 0016-COMP | | 0016-COMP |
| | 0017-COMP | | ******** | ──────── | 0017-ERR |
| | 0018-COMP | | | | 0018-COMP |
| | 0019-COMP | | | | 0019-COMP |
| | 0020-COMP | | | | 0020-COMP |
| | 0021-COMP | | | | 0021-COMP |
| | 0022-COMP | | | | 0022-COMP |
| | 0023-COMP | | | | 0023-COMP |
| | 0024-COMP | | | | 0024-COMP |
| | 0025-COMP | | | | //////// |
| | 0026-COMP | | | | |
| | 0027-COMP | | | | |
| | 0028-COMP | | | | |
| | 0029-COMP | | | | |
| | 0030-COMP | | | | |
| | 0031-COMP | | | | |
| | 0032-COMP | | | | |
| | ******** | | | | |

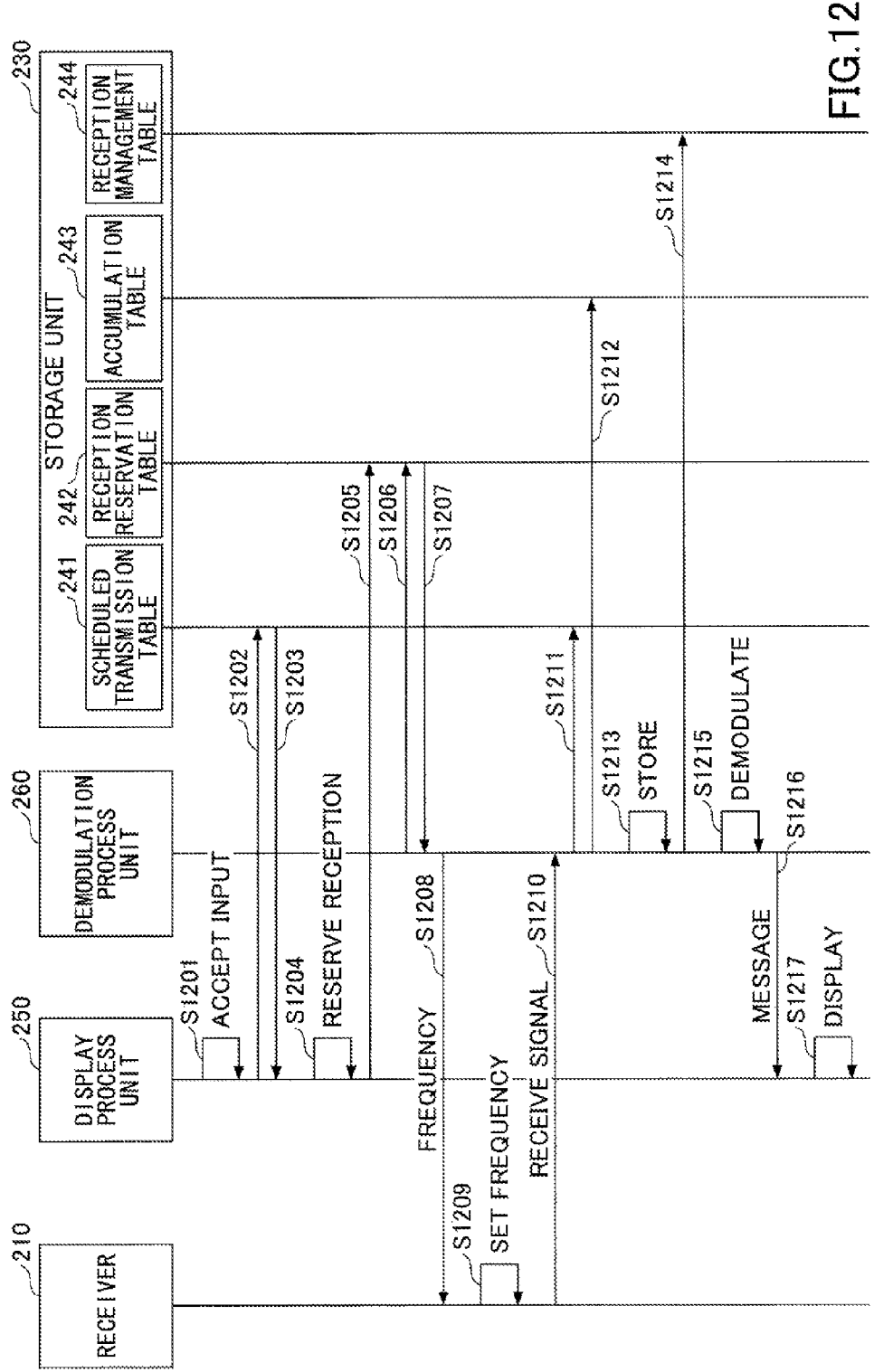

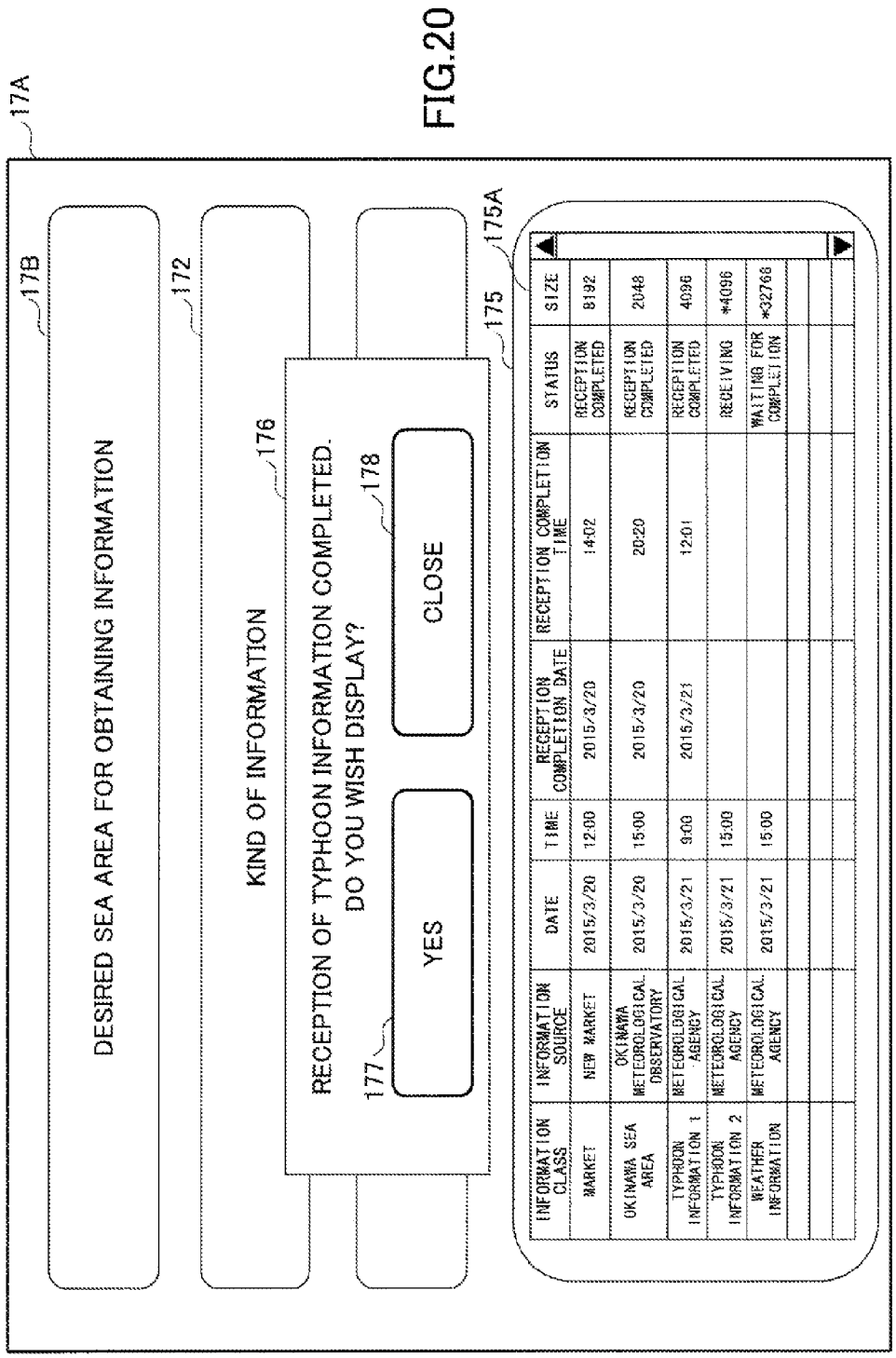

FIG.21

RESERVATION STATUS

| INFORMATION CLASS | INFORMATION SOURCE | DATE | TIME | RECEPTION COMPLETION DATE | RECEPTION COMPLETION TIME | STATUS | SIZE |
|---|---|---|---|---|---|---|---|
| MARKET | NEW MARKET | 2015/3/20 | 12:00 | 2015/3/20 | 14:02 | RECEPTION COMPLETED | 8192 |
| OKINAWA SEA AREA | OKINAWA METEOROLOGICAL OBSERVATORY | 2015/3/20 | 15:00 | 2015/3/20 | 20:20 | RECEPTION COMPLETED | 2048 |
| TYPHOON INFORMATION 1 | METEOROLOGICAL AGENCY | 2015/3/21 | 9:00 | 2015/3/21 | 12:01 | RECEPTION COMPLETED | 4096 |
| TYPHOON INFORMATION 2 | METEOROLOGICAL AGENCY | 2015/3/21 | 15:00 | | | RECEIVING | *4096 |
| WEATHER INFORMATION | METEOROLOGICAL AGENCY | 2015/3/21 | 15:00 | | | WAITING FOR COMPLETION | *32768 |
| | | | | | | | |
| | | | | | | | |
| | | | | | | | |

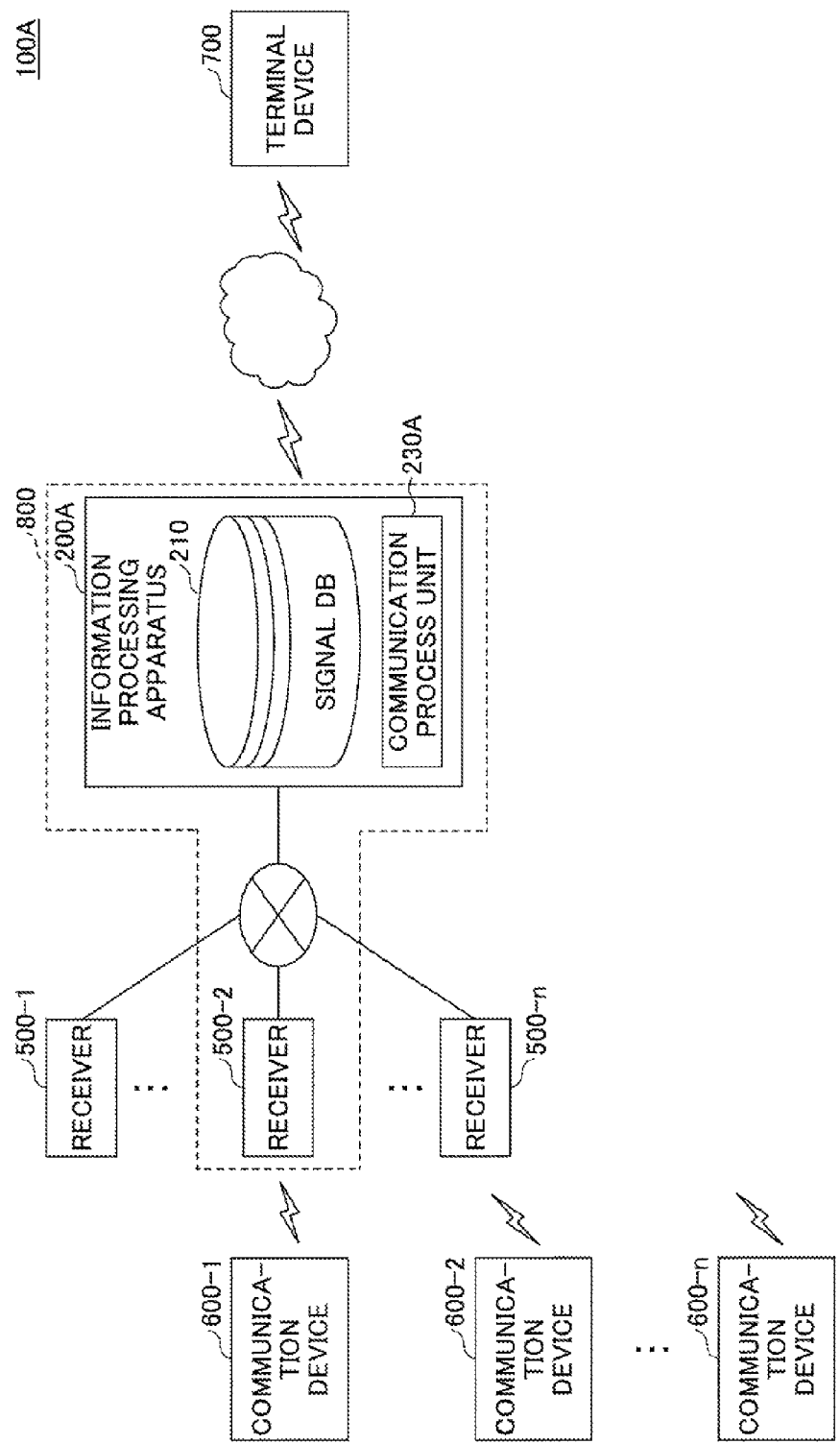

DEMODULATION METHOD, INFORMATION PROCESS APPARATUS, AND RECEPTION STATION

CROSS-REFERENCE TO RELATED APPLICATIONS

This application is based upon and claims the benefit of priority of the prior Japanese Patent Application No. 2015-188350 filed on Sep. 25, 2015, the entire contents of which are incorporated herein by reference.

FIELD

The embodiments discussed herein are related to a demodulation method, an information process apparatus, a reception station, and a non-transitory computer-readable recording medium.

BACKGROUND

Conventionally, communications that use shortwave band having frequencies from 3 MHz to 30 MHz are known. Such communications using the shortwave band have characteristics of reaching long distances by manipulating reflection with respect to the ionosphere and the earth surface (see, for example, Japanese Laid-Open Patent Publication Nos. 2005-333291 and 2003-234683).

However, due to the constantly changing state of the ionosphere, radio waves may pass through the ionosphere without being changed by the ionosphere or reflected from the ionosphere. Further, the radio wave may attenuate according to the state of the ionosphere. Further, the ionosphere exhibits different behavior with respect to radio waves according to the frequency of the radio waves.

Therefore, communication using the shortwave band is unstable due to the influence of the constantly changing state of the ionosphere. Thus, the transmission quality of communication using the shortwave band is desired to be improved.

SUMMARY

According to an aspect of the invention, there is provided a non-transitory computer-readable recording medium on which a program is recorded for a causing a processor to execute a demodulation process. The demodulation process includes detecting a preamble of a wireless signal transmitted from a first transmission station by way of a short wavelength carrier wave, extracting a first signal superimposed on the short wavelength carrier wave, the first signal being extracted from a wireless signal that is identified in accordance with the detection of the preamble, extracting a second signal superimposed on a carrier wave transmitted from a second transmission station, and performing demodulation on a target demodulation signal obtained by superimposing the first signal on the second signal.

The object and advantages of the invention will be realized and attained by means of the elements and combinations particularly pointed out in the claims.

It is to be understood that both the foregoing general description and the followed detailed description are exemplary and explanatory and are not restrictive of the invention, as claimed.

BRIEF DESCRIPTION OF DRAWINGS

FIG. 7 is a first diagram illustrating an example of a transmission schedule table;

FIG. 8 is a second diagram illustrating an example of the transmission schedule table;

FIG. 9 is a diagram illustrating an example of the reception reservation table;

FIG. 10 illustrates an example of an accumulation table;

FIG. 11 illustrates an example of a reception management table;

FIG. 12 is a sequence diagram for describing an operation of an information process apparatus according to an embodiment of the present invention;

FIG. 20 is a schematic diagram illustrating an example of a setting screen for displaying a reservation status;

FIG. 21 is a schematic diagram illustrating an example of the setting screen displaying information indicating the reservation status;

FIG. 22 is a schematic diagram for describing a configuration of a communication system according to the second embodiment of the present invention;

DESCRIPTION OF EMBODIMENTS

First Embodiment

Figure 1:
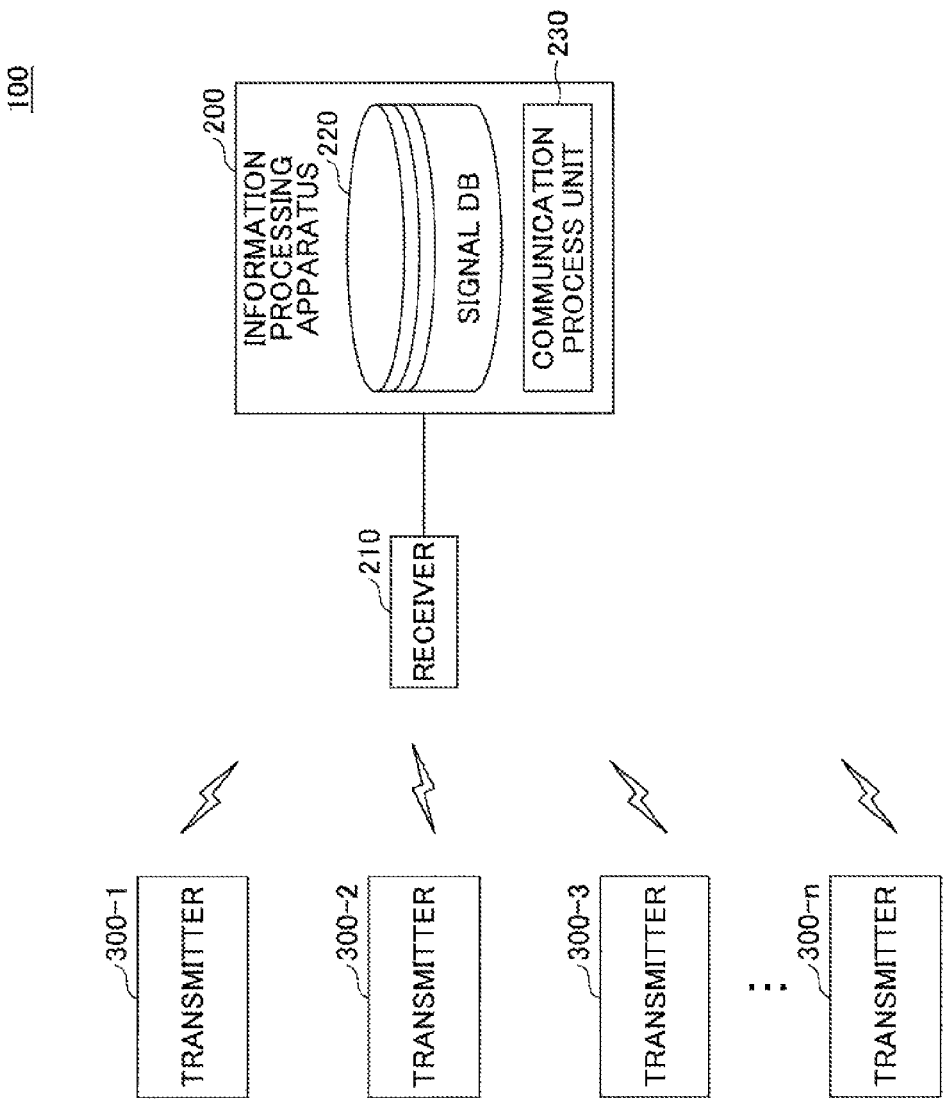
FIG. 1 is a schematic diagram illustrating a configuration of a communication system according to the first embodiment of the present invention.

Next, embodiments of the present invention are described with reference to the accompanying drawings. FIG. 1 is a schematic diagram illustrating a configuration of a communication system according to the first embodiment of the present invention.

The communication system 100 of this embodiment includes an information process apparatus 200, and transmitters 300-1, 300-2, . . . and, 300-n. In the communication system 100 of this embodiment, the information process apparatus 200 receives wireless signals transmitted from the transmitters 300-1, 300-2, . . . , 300-*n* by way of a receiver 210.

In this embodiment, the information process apparatus 200 and the transmitters 300-1, 300-2, . . . , and 300-*n* perform wireless communication (multiband wireless communication) by using multiple carrier waves having different frequencies.

In the communication system 100 of this embodiment, the information process apparatus 200 functions as a demodulation apparatus. Further, in the communication system 100 of this embodiment, the transmitters 300-1, 300-2, . . . , and 300-*n* superimposes information indicating a message on a carrier wave of a predetermined frequency band to generation a modulation signal (wireless signal) and transmits the modulation signal by way of wireless communication.

The frequency of the carrier wave of this embodiment is, for example, a frequency including a shortwave band ranging from 3 to 30 MHz. Further, in the communication system 100 of this embodiment, the modulation method that is used for performing modulation is decided beforehand.

The transmitters 300-1, 300-2, . . . , and 300-*n* are included in corresponding transmission stations allocated in various locations. The transmission station uses a frequency band assigned to each of the transmitters 300-1, 300-2, . . . , and 300-*n* and transmits wireless signals.

The transmitters 300-1, 300-2, . . . , and 300-*n* transmit modulations signals including superimposed messages at a predetermined time based on a transmission schedule table that is prepared beforehand. The modulation signals are transmitted to a large number of unspecified target receivers. That is, the transmitters 300-1, 300-2, . . . , and 300-*n* transmit modulation signals including superimposed signals indicating the same message. The transmitters 300-1, 300-2, . . . , and 300-*n* transmit the modulation signals at timings different from each other.

The message according to this embodiment may include, for example, weather information, market information, and information that are used by the general public. In the following description, a signal indicating a message is hereinafter referred to as "message signal".

In a case of transmitting a modulation signal to the information process apparatus 200 according to an embodiment of the present invention, each of the transmitters 300-1, 300-2, . . . , and 300-*n* attaches a synchronization signal and a header information signal to the modulation signal and transmits the modulation signal attached with the synchronization signal and the header information signal. In the following description, a signal indicating a message is hereinafter referred to as "message signal".

The information process apparatus 200 of this embodiment includes a signal database 220 and a communication process unit 230.

The information process apparatus 200 of this embodiment receives header-attached modulation signals from each of the transmitters 300-1, 300-2, . . . , and 300-*n*. The header-attached modulation signals are transmitted to the information process apparatus 200 at different time periods from each of the transmitters 300-1, 300-2, . . . , and 300-*n*. The transmitted header-attached modulation signals are attached with headers including the same message signal. That is, the information process apparatus 200 receives modulation signals attached with headers including the same message signal at respective timings defined in a transmission schedule table.

The information process apparatus 200 categorizes and stores the received header-attached modulation signals in the signal database 220. The modulation signals attached with headers including the same message signal are stored in a corresponding category in the signal database 220. Then, the information process apparatus 200 extracts message signals from the header of each of the header-attached modulation signals by way of the communication process unit 230.

More specifically, the communication process unit 230 of this embodiment converts the header-attached modulation signals into signals of an intermediate frequency. Then, the communication process unit 230 extracts message signals being superimposed in a carrier wave from the signal of the intermediate frequency. The message signal is a modulated signal in which information indicating a message is modulated in accordance with a predetermined modulation method. The message signal of this embodiment is a signal prior to being digitalized (encoded) during demodulation.

When message signals are extracted from the header-attached modulation signals, the information process apparatus 200 compares the waveforms of the extracted message signals. In a case where the match ratio according to the comparison is greater than or equal to a predetermined threshold, the information process apparatus 200 generates a target demodulation signal from the extracted message signals and performs demodulation on the target demodulation signal.

In each of the transmitters 300-1, 300-2, . . . , and 300-*n*, message signals are demodulated into message signals having waveforms that are extremely similar to the waveforms of the message signals superimposed on the carrier wave. Thereby, the accuracy of information obtained from wireless signals can be improved.

In the following description, the terms "the transmitters 300-1, 300-2, . . . , and 300-*n*," may be hereinafter collectively referred to as "transmitter 300" in a case where "the transmitters 300-1, 300-2, . . . , and 300-*n*" are not distinguished among each other.

Figure 2:
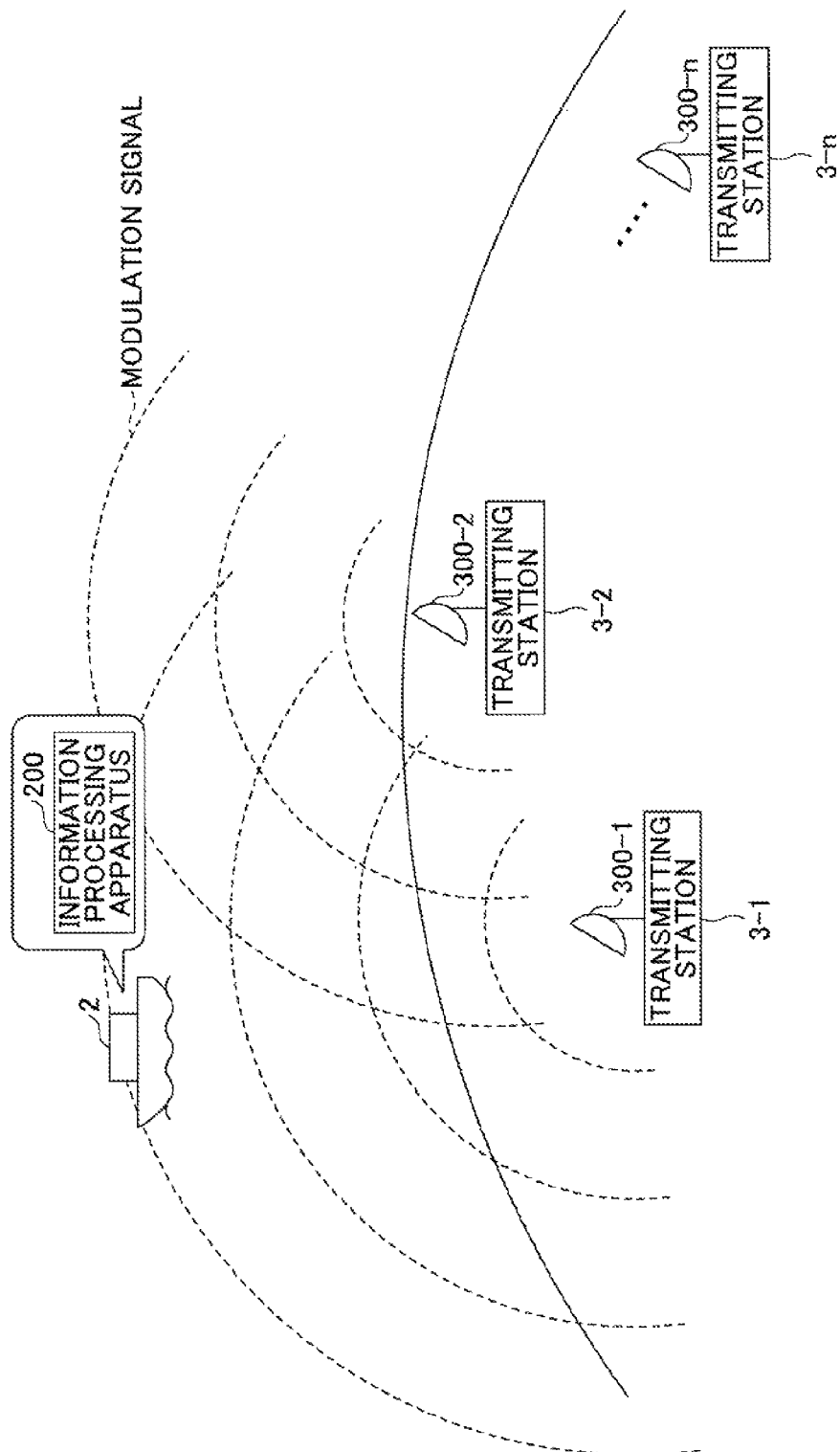
FIG. 2 is a schematic diagram illustrating the use of the communication system according to the first embodiment.

Next, an example of communicating with the communication system 100 according to the first embodiment is described with reference to FIG. 2. FIG. 2 is a schematic diagram illustrating the use of the communication system 100 according to the first embodiment.

The communication system 100 of the first embodiment may be applied to, for example, communications between a ship 2 located on the ocean and transmission stations 3-1, 3-2, . . . , and 3-*n* located on the land. In a case where "the transmission stations 3-1, 3-2, . . . , and 3-*n*" are not distinguished among each other, the transmission stations 3-1, 3-2, . . . , and 3-*n* are collectively referred to as "transmission stations 3".

In this case, the data process apparatus 200 is mounted on the ship located on the ocean whereas the transmission stations 3-1, 3-2, . . . , and 3-*n* and the transmitters 300-1, 300-2, . . . , and 300-*n* are located on the land.

For example, when a header-attached modulation signal is transmitted from the transmitter 3 as illustrated in FIG. 2, the header-attached modulation signal reaches the ocean by being reflected from, for example, the ionosphere, the earth's surface, or the ocean surface. The information process apparatus 200 and the receiver 210 are mounted on the ship 2 located on the ocean. In a case where the header-attached modulation signal that has reached the ocean is received by the information process apparatus 200 by way of the receiver 210, the information process apparatus 200 stores the received header-attached modulation signal in the signal database 220.

In this case, the information process apparatus 200 does not always receive every header-attached modulation signal at a single reception. The example of FIG. 2 illustrates a case where the information process apparatus 200 receives only a portion of the header-attached modulation signal transmitted at one timing from the transmitter 300-1 and a portion of another header-attached modulation signal transmitted at another timing from the transmitter 300-2.

The information process apparatus 200 generates a target demodulation signal by using a message signal extracted from the header-attached modulation signal received from each of the transmitters 300-1, 300-2, so that the target demodulation signal has a waveform similar to a waveform of the message signal that is superimposed on the carrier wave from each of the transmitters 300-1, 300-2. Thereby, the information process apparatus 200 performs demodulation on the generated target demodulation signal.

Figure 3:
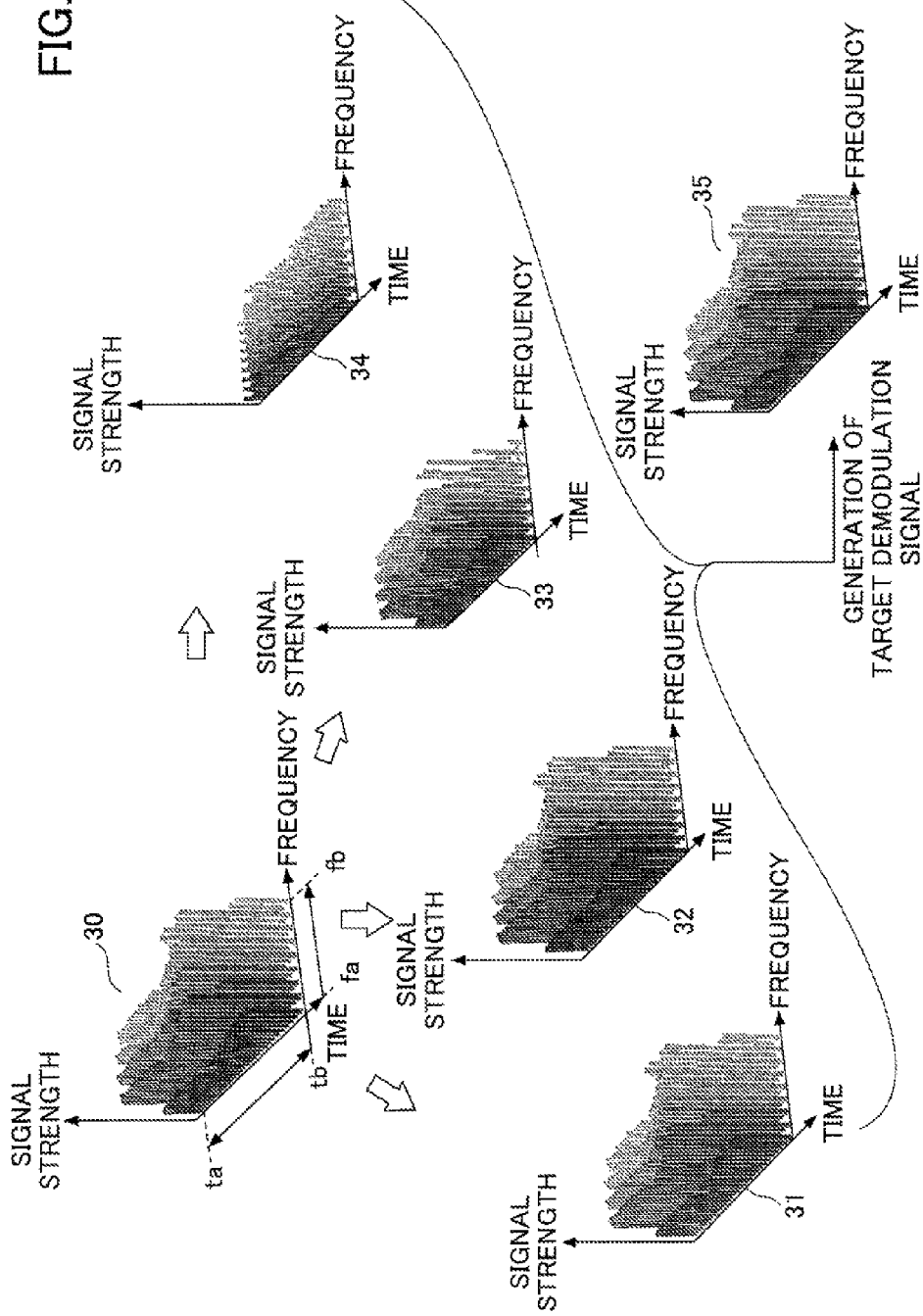
FIG. 3 is a schematic diagram illustrating the message signal and the target demodulation signal.

Next, the message signal and the target demodulation signal are described with reference to FIG. 3. FIG. 3 is a schematic diagram illustrating the message signal and the target demodulation signal.

In FIG. 3, the information process apparatus 200 extracts message signals 31 to 34 from the header-attached modulation signal received from each of the transmitters 300-1 to 300-4.

Note that each of the signals illustrated in FIG. 3 is represented by an axis indicating time, an axis indicating frequency, and an axis indicating signal strength. The message signal 30 of FIG. 3 is a message signal that is superimposed on a carrier wave by way of the transmitters 300-1 to 300-4.

The message signal 31 illustrated in FIG. 3 is a signal extracted from the header-attached modulation signal transmitted from the transmitter 300-1. Similarly, the message signal 32 illustrated in FIG. 3 is a signal extracted from the header-attached modulation signal transmitted from the transmitter 300-2. The message signal 33 is a signal extracted from the header-attached modulation signal transmitted from the transmitter 300-3. The message signal 34 is a signal extracted from the header-attached modulation signal transmitted from the transmitter 300-4.

Note that the header-attached modulation signal transmitted from a single transmitter 300 may include a signal modulated by using multiple different carrier waves. Therefore, the message signal 30 is a signal that is superimposed on each of the multiple different carrier waves. The message signal 30 is a signal having the same number as the frequency number of the carrier wave.

In FIG. 3, the message signal 34 has a signal strength that is significantly smaller than the signal strength of the message signal 30. Therefore, the information process apparatus 200 cannot sufficiently receive the message signal 30 from the header-attached modulation signal transmitted from the transmitter 300-4.

On the other hand, the waveform of the message signal 31 and the waveform of the message signal 32 are similar to the waveform of the message signal 30. Therefore, the information process apparatus 200 can receive the message signal 30 in high sensitivity from the header-attached modulation signal transmitted from each of the transmitters 300-1, 300-2.

Further, the waveform of the message signal 33 is different from the waveform of the message signal 30. Therefore, the information process apparatus 200 can only receive a portion of the message signal 30 because the header-attached modulation signal transmitted from the transmitter 300-3 is affected by noise or the like.

In the message signal 30 of the first embodiment, the waveform of each of the message signals 31 to 34 becomes more similar to the waveform of the message signal 30 as the values of the signal strengths specified in accordance with each unit of time of a resolution power corresponding to a modulation rate become closer to the values of the signal strengths of the message signals 31-34 at the corresponding units of time.

The information process apparatus 200 of the first embodiment compares the four message signals 31 to 34 and selects a value to be used from the values of the signal strengths specified in accordance with each unit of time of a resolution power corresponding to the modulation rate of each of the message signals 31 to 34. Then, the information process apparatus 200 generates a target demodulation signal 35 based on the selected value.

As described above, the information process apparatus 200 generates the target demodulation signal 35 from the message signals 31-34 extracted from the header-attached modulation signals, so that the target demodulation signal 35 has a waveform closest to the waveform of the message signal 30. After generating the target demodulation signal 35, the information process apparatus 200 performs demodulation on the target demodulation signal 35. Accordingly, the above-described first embodiment can improve transmission quality. The term "transmission quality" indicates the degree in which a signal can be transmitted without noise, echoing or code error.

Next, the header-attached modulation signal of the first embodiment is described with reference to FIG. 4. Because the configuration of the data included in the header-attached modulation signal of the first embodiment is the same for all of the header-attached modulation signals transmitted from the transmitters 300-1 to 300-4, the header-attached modulation signal transmitted from the transmitter 300-1 is described with reference to FIG. 4.

Figure 4:
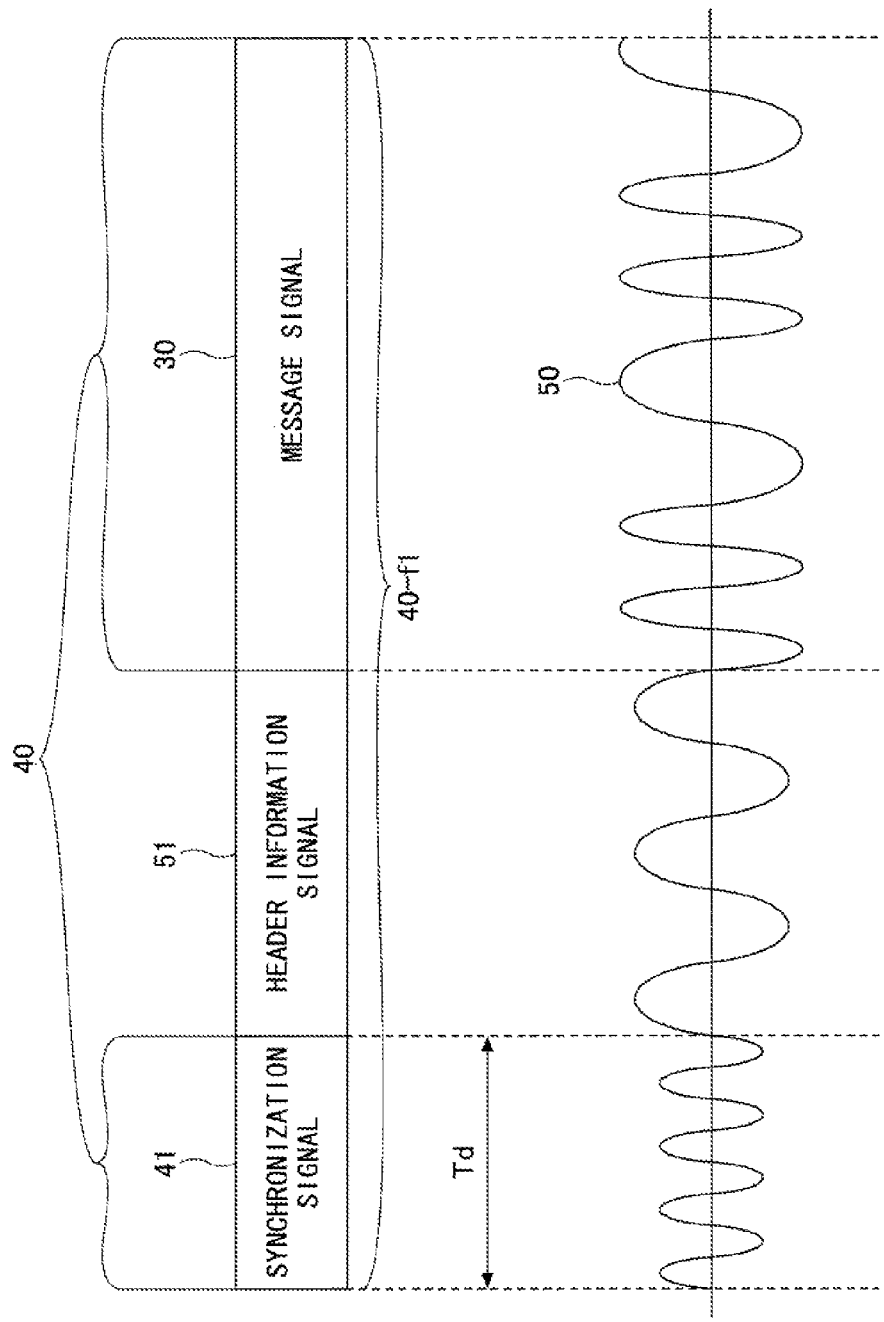
FIG. 4 illustrates a header-attached modulation signal in a frequency of a carrier wave.

FIG. 4 illustrates a header-attached modulation signal 40-$f1$ in a frequency f1 of a carrier wave. The header-attached modulation signal 40-$f1$ of FIG. 4 is included in the header-attached modulation signal 40 transmitted from the transmitter 300-1 in a predetermined frequency band.

Note that the header-attached modulation signal 40 of the first embodiment includes header-attached modulation signals corresponding to a frequency of each carrier wave in a frequency band. For example, in a case where the number of carrier waves included in a frequency band is "n", the header-attached modulation signal 40 includes "n" header-attached modulation signals corresponding to the number of carrier waves. The header-attached modulation signals corresponding to respective frequencies have the same configuration.

The header-attached modulation signal 40-$f1$ of the first embodiment includes a synchronization signal 41, a header information signal 51, and a message signal 30.

The synchronization signal 41 that is attached to all of the signals transmitted and received in the communication system 100 has a predetermined frequency. The synchronization signal 41 is a characteristic signal that serves as a preamble of the header-attached modulation signal 40-$f1$. The frequency of the synchronization signal 41 is associated with the communication system 100. Thus, in a case where the information process apparatus 200 of the first embodiment receives a signal in which the beginning of the signal is the synchronization signal 41, the information process apparatus 200 continues to receive the signals continuing from the synchronization signal 41.

In the first embodiment, the length of the synchronization signal 41 is determined beforehand. In the first embodiment, the length of the synchronization signal 41 refers to a period in which the synchronization signal 41 is output from the transmitter 300-1. In the first embodiment, the length of the synchronization signal 41 is indicated as "Td" seconds.

The header information signal 51 of the first embodiment includes information that distinguishes the type of message included in the message signal 30. The header information signal 51 may also include, for example, information indicating the time for starting transmission of header-attached modulation signal 40-f1 or information indicating the frequency f1 of the header-attached modulation signal 40-f1.

The message signal 30 of the first embodiment is a signal in which information of a message is modulated by the transmitter 300-1 according to a predetermined modulating method.

In a case of extracting the message signal 30 from the header-attached modulation signal 40-f1, the synchronization signal 41 and the header information signal 51 are extracted along with the extracting of the message signal 30. That is, the information process apparatus 200 of the first embodiment extracts a signal (waveform) 50 including the synchronization signal 41, the header information signal 51, and the message signal from the header-attached modulation signal 40-f1.

In the following description, the signal being extracted from the header-attached modulation signal and including the synchronization signal 41, the header information signal 51, and the message signal 30 is referred to as "extraction signal".

Figure 5:
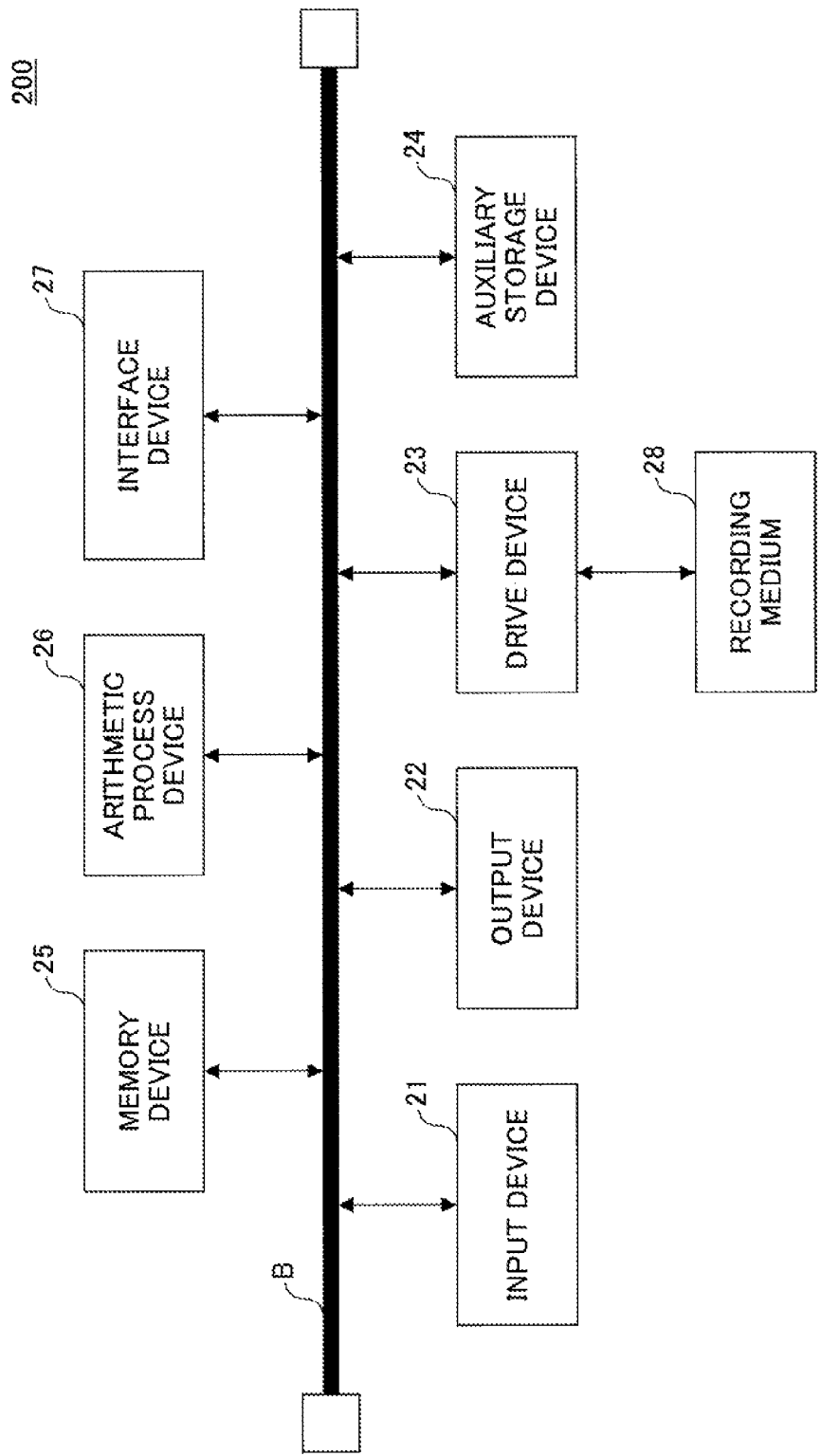
FIG. 5 is a schematic diagram illustrating an example of the hardware configuration of a demodulation server.

Next, a hardware configuration of the information process apparatus 200 of the first embodiment is described with reference to FIG. 5. FIG. 5 is a schematic diagram illustrating an example of the hardware configuration of a demodulation server.

The information process apparatus 200 of the first embodiment includes an input device 21, an output device 22, a drive device 23, an auxiliary storage device 24, a memory device 25, an arithmetic process device 26, and an interface device 27, that are connected to each other by way of a bus B.

The input device 21 is a device that inputs various information and signals to the information process apparatus 200. The input device 21 may be, for example, a keyboard. The output device 22 is a device that outputs various information and signals from the information process apparatus 200. The output device 22 may be, for example, a display.

The interface device 27 is a device that connects the information process apparatus 200 to a network. The interface device 27 may be, for example, a modem or a LAN (Local Area Network) card.

The demodulation program is at least a part of the various programs that control the information process apparatus 200. The demodulation program may be provided by way of, for example, distribution of a non-transitory computer-readable recording medium 28 or downloading from a network. The non-transitory computer-readable recording medium 28 on which the demodulation program is recorded may be various types of recording media. For example, the non-transitory computer-readable recording medium 28 may be a recording medium that optically, electrically, or magnetically records information (e.g., a CD-ROM, a flexible disk, a Magneto-Optical disk). Further, the non-transitory computer-readable recording medium 28 may also be a semiconductor memory that electrically records information (e.g., a ROM, a flash memory).

When the non-transitory computer-readable recording medium 28 on which the demodulation program is recorded is placed in the drive device 23, the demodulation program is installed into the auxiliary storage device 24 from the non-transitory computer-readable recording medium 28 by way of the drive device 23. In a case where the demodulation program is downloaded from the network, the demodulation program is installed into the auxiliary storage device 24 by way of the interface device 27.

The auxiliary storage device 24 not only stores the installed demodulation program but also stores other necessary files, data, and the like. When a computer of the information process apparatus 200 is activated, the demodulation program is read out from the auxiliary storage device 25 and loaded to the memory device 25. Then, the arithmetic process device 26 implements the various processes described below according to the demodulation program stored in the memory device 25.

Note that the information process apparatus 200 of the first embodiment may be, for example, a table terminal including a display operation device in which the input device 21 and the output device 22 form a united body.

Note that the hardware configuration of the transmitter 300 of the first embodiment may be the same as a typical wireless communication device. Therefore, detailed description of the hardware configuration of the transmitter 300 of the first embodiment is omitted.

Figure 6:
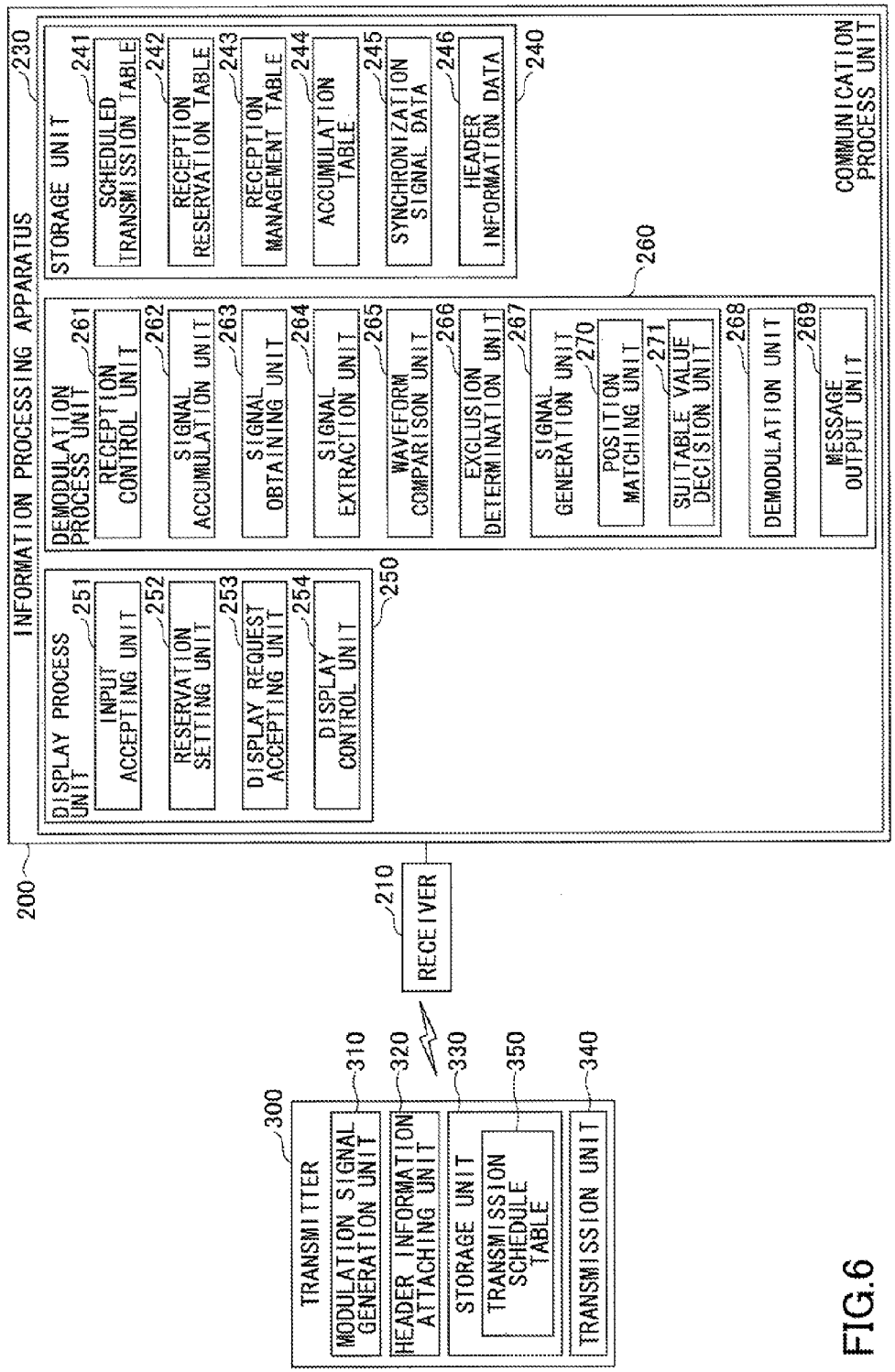
FIG. 6 is a schematic diagram illustrating the functions (functional blocks) of each of the devices and units included in the communication system of the first embodiment.

Next, each of the devices and units included in the communication system 100 of the first embodiment is described with reference to FIG. 6. FIG. 6 is a schematic diagram illustrating the functions (functional blocks) of each of the devices and units included in the communication system 100 of the first embodiment.

First, the transmitter 300 of the first embodiment is described. The transmitter 300 of the first embodiment includes a modulation signal generation unit 310, a header information adding unit 320, a storage unit 330, and a transmitting unit 340.

The modulation signal generation unit 310 modulates a carrier wave in a predetermined frequency band, superimposes a message signal on the carrier wave, and generates a modulation signal with a synchronization signal added to a header of the modulation signal. Note that the message signal may be input, for example, at the transmission station 3 including the transmitter 300.

Note that the frequency fd of the synchronization signal, the signal strength of the synchronization signal, and the length Td [sec.] of the synchronization signal are stored beforehand in the modulation signal generation unit 310 of the first embodiment. Thus, the modulation signal generation unit 310 generates a synchronization signal having a waveform that is the same as the waveform of the below-described synchronization signal data 245.

The header information adding unit 320 of the first embodiment generates a header attached modulation signal by adding a header information signal to the modulation signal added with the synchronization signal. The header information signal of the first embodiment serves as a signal having a waveform that is the same as the waveform of the below-described header information data 246.

The storage unit 330 includes a transmission schedule table 350. The transmission schedule table 350 is a part of the below-described transmission schedule table 341. The transmission schedule table 350 stores a transmission start time of the header attached modulation signal of the transmitter 300 in correspondence with the frequency of the carrier of the header attached modulation signal. Details of the transmission schedule table 350 are described below.

The transmission unit 340 transmits the header attached modulation signal in accordance with the transmission schedule table 350. Note that the header attached modulation signal transmitted from the transmitter 300 may be transmitted to, for example, the information process apparatus 200 or an unspecified number of devices.

Next, the information process apparatus 200 of the first embodiment is described. The information process apparatus 200 of the first embodiment includes a communication process unit 230.

The information process apparatus 200 of the first embodiment receives the header attached modulation signal of the carrier wave of the predetermined frequency at the predetermined time according to the transmission schedule of the header attached modulation signal of the transmitter 300. Then, the information process apparatus 200 generates target demodulation signals from the message signals extracted from multiple header attached modulation signals. Demodulation is completed when the target demodulation signals are generated. The reception of messages is assumed to be completed when the demodulation is completed. The reception result is displayed on a display or the like when the reception of messages is completed.

The communication process unit 230 of the first embodiment includes a storage unit 240, a display process unit 250, and a demodulation process unit 260.

A transmission schedule table 241, a reception schedule table 242, a reception management table 243, an accumulation table 244, synchronization signal data 245, and header information data 246 are stored in the storage unit 240 of the first embodiment. The storage unit 240 of the first embodiment stores each of the above-described tables and data in predetermined areas of a storage device such as the auxiliary storage device 24 or the memory device 25.

The transmission schedule table 241 is a table indicating a transmission schedule of the transmission station 3. The transmission schedule table 241 includes transmission schedule tables indicating the transmission schedules of each of the multiple transmission stations.

The reception schedule table 242 stores the frequency of the carrier wave of the header attached modulation signal received by the information process apparatus 200 in correspondence with the time of starting the reception.

The reception management table 243 is a table indicating the status of the reception of the header attached modulation signal of the information process apparatus 200.

The accumulation table 244 is referred when the header attached modulation signal received by the information process apparatus 200 is stored in the signal database 220. More specifically, the accumulation table 244 stores, for example, the types of messages in correspondence with information indicating the area in which the header attached modulation signal is stored.

Details of each of the above-described tables are described below.

The synchronization signal data 245 of the first embodiment includes data that is referred by the modulation process unit 260. More specifically, the synchronization signal data 245 includes the frequency fd of the predetermined synchronization signal, the signal strength of the synchronization signal, and the waveform of the synchronization signal of the length Td [sec.] of the synchronization signal. The synchronization signal data 245 is stored in the storage unit 240 in the form of waveform data generated beforehand.

The functions of the display process unit 250 of the first embodiment are implemented by executing a display program with the arithmetic process device 26 of the data process apparatus 200. The display process unit 250 includes an input accepting unit 251, a reservation setting unit 252, a display request accepting unit 253, and a display control unit 254. The display process unit 250 controls the displaying of various information and signals by the information process apparatus 200.

The input accepting unit 251 accepts input to the information process apparatus 200. More specifically, the input accepting unit 251 accepts input of, for example, reservations for receiving header-attached modulation signals and requests for displaying messages.

The reservation setting unit 252 accepts an input reservation for receiving the header-attached modulation signal, generates the reception reservation table 242 based on the transmission schedule table 241, and stores the generated reception reservation table 242 in the storage unit 240. The display request accepting unit 253 accepts a request for displaying a message from the demodulation process unit 260.

The demodulation process unit 260 obtains the header-attached modulation signal received according to the reception reservation table 242, generates a target demodulation signal, and demodulates the generated target demodulation signal. Then, the demodulation process unit 260 requests the display process unit 250 to display a message resulting from the demodulation.

The functions of the demodulation process unit 260 of the first embodiment are implemented by executing a demodulation program with the arithmetic process device 26 of the information process apparatus 200.

The demodulation process unit 260 of the first embodiment includes a reception control unit 261, a signal accumulation unit 262, a signal obtaining unit 263, a signal extraction unit 264, a waveform comparison unit 265, an exclusion determination unit 266, a signal generation unit 267, a demodulation unit 268, and a message output unit 269.

The reception control unit 261 refers to the reception reservation table 242, changes the reception frequency of the receiver 210, and receives the header-attached modulation signal.

When the header-attached modulation signal is received, the signal accumulation unit 262 refers to the transmission schedule table 241 and the accumulation table 244. Then, the signal accumulation unit 262 identifies the type of message having a matching reception start time and a matching frequency of the carrier wave. Then, the signal accumulation unit 262 stores the header-attached modulation signal in a storage area of the signal database 220 that corresponds to the identified type of message. Note that the signal that is stored in the signal database 220 by the signal accumulation unit 262 is a signal prior to being demodulated.

Further, the signal accumulation unit 262 of the first embodiment updates the reception management table 243 when the header attached modulation signal is stored in the signal database 220.

The signal obtaining unit 263 obtains the header-attached modulation signal with respect to each type of message from the signal database 220. That is, the signal obtaining unit 263 of the first embodiment obtains the header-attached modulation signal stored in the signal database 220 in accordance with the transmission start time and the frequency of the header-attached modulation signal. Note that the transmission start time and the frequency of the header-attached modulation signal may be included in the header information signal in the form of a preamble part of the header-attached modulation signal.

The signal extraction unit 264 transforms the header-attached modulation signal obtained from the signal obtaining unit 264 into an intermediate frequency signal and extracts an extraction signal included in the header-attached modulation signal. The extraction signal includes, for example, a synchronization signal, a header information signal, and a message signal. In a case where multiple header-attached modulation signals are obtained by the signal obtaining unit 263, the signal extraction unit 264 of this embodiment extracts an extraction signal from each of the header-attached modulation signals.

The waveform comparison unit 265 compares the waveforms among the extraction signals and obtains a degree of match (matching degree) according to the comparison. The waveform of the extraction signal is a waveform including a synchronization signal, a header information signal, and a message signal. The waveform of the extraction signal is a waveform corresponding to the waveform illustrated in FIG. 4.

Further, the waveform comparison unit 265 compares the waveform of the synchronization signal included in the extraction signal with the synchronization signal data 245. Further, the waveform comparison unit 265 compares the waveform of the header information signal included in the extraction signal with the header information data 246.

The exclusion determination unit 266 excludes a header-attached modulation signal that does not have a matching degree greater than or equal to a predetermined threshold based on the comparison of the waveform of the synchronization signal and the comparison of the waveform of the header information signal performed by the waveform comparison unit 265. The header-attached modulation signal that is excluded is not subject to the below-described signal generation process.

The signal generation unit 267 generates a target demodulation signal. More specifically, the signal generation unit 267 includes a position matching unit 270 and a suitable value decision unit 271. The position matching unit 270 superimposes the message signals included in the extraction signal. Based on the results of superimposing the message signals, the suitable value decision unit 271 decides the value of the signal strength that is to be selected as the value of the target demodulation signal. The processes performed by the signal generation unit 267 are described in detail below.

The demodulation unit 268 demodulates a target demodulation signal generated by the signal generation unit 267. The message output unit 269 outputs a display request along with a message resulting from the demodulation to the display process unit 250.

Next, each table stored by the storage unit 240 is described with reference to FIGS. 7 to 11.

FIG. 7 is a first diagram illustrating an example of a transmission schedule table. FIG. 7 depicts a transmission schedule signal 241A indicating a schedule for transmitting header-attached modulation signals from the transmission station 3-1.

The transmission schedule table 241A includes information items such as time, frequency fa1, frequency fa2, frequency fa3, and frequency fa4.

The value of the item "time" indicates the time of transmitting the header-attached modulation signal. The value of the item "frequency fa1" indicates the type of message transmitted by a carrier wave of a frequency band in which the frequency fa1 is the center frequency of the frequency band. The value of the item "frequency fa2" indicates the type of message transmitted by a carrier wave of a frequency band in which the frequency fa2 is the center frequency of the frequency band. The value of the item "frequency fa3" indicates the type of message transmitted by a carrier wave of a frequency band in which the frequency fa3 is the center frequency of the frequency band. The value of the item "frequency fa4" indicates the type of message transmitted by a carrier wave of a frequency band in which the frequency fa4 is the center frequency of the frequency band.

In the example of FIG. 7, the transmission station 3-1 transmits market information as a message at 8:00 by way of a carrier wave in a frequency band having the frequency fa1 as its center frequency. Then, the transmission station 3-1 transmits weather information as a message at 8:30 by way of a carrier wave in a frequency band having the frequency fa4 as its center frequency.

FIG. 8 is a second diagram illustrating an example of the transmission schedule table. FIG. 8 depicts a transmission schedule signal 241B indicating a schedule for transmitting header-attached modulation signals from the transmission station 3-B.

The transmission schedule table 241B includes information items such as time, frequency fb1, frequency fb2, frequency fb3, and frequency fb4.

In the example of FIG. 8, the transmission station 3-2 transmits weather sea information of area 1 as a message at 8:00 by way of a carrier wave in a frequency band having the frequency fb3 as its center frequency. Then, the transmission station 3-2 transmits typhoon information 2 as a message at 11:00 by way of a carrier wave in a frequency band having the frequency fb2 as its center frequency.

FIG. 9 is a diagram illustrating an example of the reception reservation table. The reception reservation table 242 of FIG. 9 includes information items such as time, market information, Okinawa weather sea information, typhoon information 1, typhoon information 2, and weather information.

In the reception reservation table 242, the item "time" is associated with the other items of the reception reservation table 242. The other items associated with the item "time" indicate the type of message that are set to be information to be received by the information process apparatus 200.

The value of the item "time" indicates the time in which the receiver 210 receives information. The value of the item "market information" indicates the center frequency of the frequency band of the carrier wave on which market information is transmitted. The value of the item "Okinawa weather sea information" indicates the center frequency of the frequency band of the carrier wave on which Okinawa weather sea information is transmitted.

The value of the item "typhoon information 1" indicates the center frequency of the frequency band of the carrier wave on which typhoon information 1 is transmitted. The value of the item "typhoon information 2" indicates the center frequency of the frequency band of the carrier wave on which typhoon information 2 is transmitted. The value of the item "weather information" indicates the center frequency of the frequency band of the carrier wave on which sea weather information is transmitted.

In the example of FIG. 9, the information process apparatus 200 receives, on 8:00, market information transmitted by way of a carrier wave in a frequency band having the frequency fa1 as its center frequency. In the example of FIG. 9, the information process apparatus 200, receives, on 8:30, weather information transmitted by way of a carrier wave in a frequency band having the frequency fa4 as its center frequency.

FIG. 10 illustrates an example of an accumulation table 243. The accumulation table 243 of this embodiment includes information items such as type of message and storage area.

The value of the item "type of message" indicates the type of message to be transmitted. The value of the item "storage area" indicates information used for identifying a storage area of a signal database 220 in which the header attached modulation signal of a carrier wave used for transmitting a corresponding type of message is stored.

In the example of the accumulation table 243 of FIG. 10, a header-attached modulation signal on which a type of message "market information" is superimposed is stored in an area A-1 of the signal database 220. Further, in the example of the accumulation table 243, a header-attached modulation signal on which a type of message "typhoon information 1" is superimposed is stored in an area A-3 of the signal database 243.

FIG. 11 illustrates an example of a reception management table 244. The reception management table 244 includes information items such as time, data, type of message, and reception status. The information items of the reception management table 244 are associated to each other.

The value of the item "date" indicates the present date. The value of the item "time" indicates the present time. The value of the item "type of message" indicates the type of message that is received. The value of the item "reception status" indicates the reception status a corresponding type of message.

For example, it can be understood that the reception status of the message "market status" at 12:00 on Mar. 20, 2015 is "completed" according to the example of FIG. 11. In the first embodiment, a "completed" reception status refers to a state in which modulation of a message is completed.

Similarly, it can be understood that the reception status of the message "typhoon information 2" at 15:00 on Mar. 21, 2015 is in a "receiving" state. Further, the reception status of the message "weather information" at 15:00 on Mar. 21, 2015 is in a "waiting" state. In this embodiment, a "waiting" reception status refers to a state in which the generation of a target message signal is not completed, and continuing to wait for receiving the next header-attached modulation signal.

In the first embodiment, when the reception of a message becomes "complete" according to the reception management table 244, the display process unit 250 is requested to display the message.

Next, an operation performed by the information process apparatus 200 of the first embodiment is described with reference to FIG. 12.

In the information process apparatus 200 of the first embodiment, the reservation setting unit 252 of the display process unit 250 refers to the transmission schedule table 241 when the input accepting unit 251 receives input of the type of message to be received (Step S1201, S1202). Then, the reservation setting unit 252 obtains a center frequency of the frequency band of the carrier wave used for transmitting the input type of message from the transmission schedule table 241 (Step S1203). The reservation setting unit 252 also obtains the time of starting the transmission of the input type of message (transmission start time) from the transmission schedule table 241 (Step S1203).

Then, the reservation setting unit 252 of the display process unit 250 generates a reception reservation table 242 including the input type of message (Step S1204) and stores the generated reception reservation table 242 in the storage unit 240 (Step S1205). The reception reservation table 242 also the obtained center frequency and the obtained transmission start time that are associated with the input type of message.

The demodulation unit 260 refers to the reception reservation table 242 (Step S1206) and obtains the center frequency having a broadcast start time closest to the present time (Step S1207). Then, the demodulation unit 260 sends a setting request to the receiver 210 for requesting the receiver 210 to set the reception frequency to the obtained center frequency (Step S1208).

Upon receiving the setting request, the receiver 210 sets the requested frequency as the reception frequency in accordance with the setting frequency (Step S1209). When the receiver 210 receives the header-attached modulation signal of the set reception frequency, the receiver 210 delivers the received header-attached modulation signal to the demodulation process unit 260 (Step S1210).

Upon receiving the header-attached modulation signal, the demodulation process unit 260 refers to the transmission schedule table 241 and obtains the type of message corresponding to the reception frequency and the reception start time (Step S1211). Then, the demodulation process unit 260 refers to the accumulation table 244 (Step S1212) and stores the received header-attached modulation signal in a corresponding storage area of the signal database 220 (Step S1213). Further, the demodulation process unit 260 updates the reception management table 243 in accordance with the received header-attached modulation signal (Step S1214).

Then, the demodulation process unit 260 performs demodulation by using the header-attached modulation signal stored in the signal database 220 (Step S1215). Details performed in Step S1215 are described below.

Then, the demodulation process unit 260 outputs a demodulated message and a request to display the message to the display process unit 250 (Step S1217).

Figure 13:
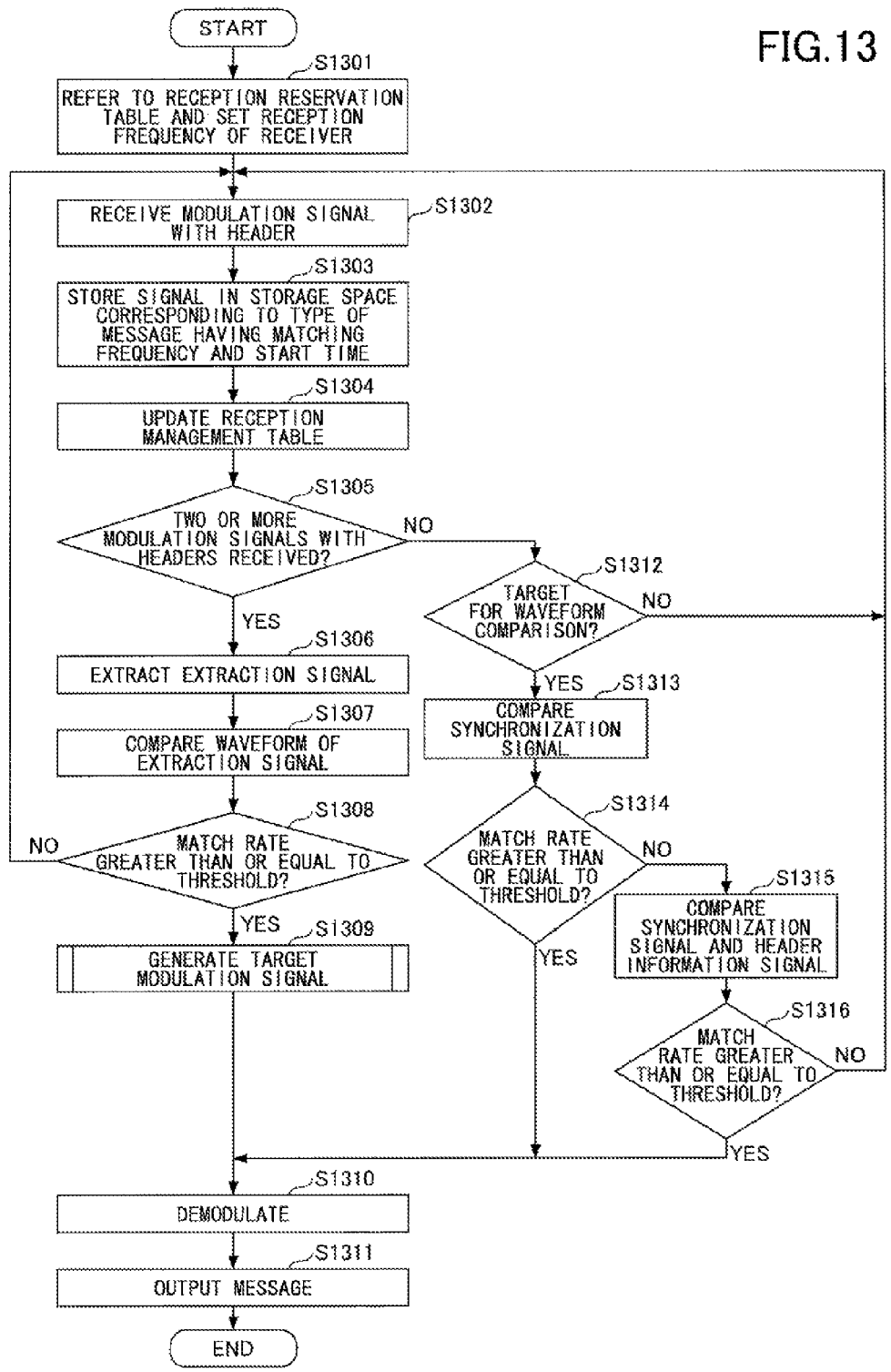
FIG. 13 is a first flowchart for describing the processes performed by a demodulation process unit.

Next, the processes performed by the demodulation process unit 260 of the first embodiment are described in detail with reference to FIG. 13. FIG. 13 is a first flowchart for describing the processes performed by the demodulation process unit 260.

In the demodulation process unit 260 of the first embodiment, the reception control unit 261 refers to the reception reservation table 242 and sends a setting request to the receiver 210 for requesting the receiver 210 to set the reception frequency (Step S1301). Then, the demodulation process unit 260 receives a header-attached modulation signal via the receiver 210 (Step S1302).

Then, the signal accumulation unit 262 of the demodulation process unit 260 refers to the transmission schedule table 241 and the accumulation table 244 and stores the received header-attached modulation signal in a storage area of the signal database 220 that corresponds to a type of message matching the reception signal and the reception start time of the header-attached modulation signal (Step S1303). Then, the signal accumulation unit 262 updates the reception management table 243 (Step S1304).

Then, the signal accumulation unit 262 determines whether two or more header-attached modulation signals are stored in the storage area of the signal database 220 in which the received header-attached modulation signal is stored (Step S1305). In a case where two or more header-attached modulation signals are not stored in the storage area of the signal database 220 (No in Step S1305), the demodulation process unit 260 proceeds to the below-described Step S1312.

In a case where two or more header-attached modulation signals (multiple header-attached modulation signals) are stored in the storage area of the signal database 220, the signal obtaining unit 263 of the demodulation process unit 260 obtains the multiple header-attached modulation signals that are stored in the storage area having the same identifier. Then, the signal extracting unit 264 of the demodulation process unit 260 extracts an extraction signal from each of the obtained multiple header-attached modulation signals (Step S1306). The extracting of extraction signals is performed in the above-described manner.

Then, the waveform comparison unit 265 of the demodulation process unit 260 compares the waveforms of the extraction signals extracted from the multiple header-attached modulation signals and obtains a degree of match (matching degree) according to the comparison (Step S1307). Note that a known method may be used to compare the waveforms.

Then, the demodulation process unit 260 determines whether the matching degree is greater than or equal to a predetermined threshold (Step S1308). In a case where the matching degree is not greater than or equal to the predetermined threshold (No in Step S1308), the demodulation process unit 260 returns to Step S1302.

In a case where the matching degree is greater than or equal to the predetermined threshold (Yes in Step S1308), the demodulation process unit 260 generates a target demodulation signal from the multiple extraction signals (Step S1309). Details of the process performed in Step S1309 are described below. Note that the threshold of Step S1308 may be set beforehand to the demodulation process unit 260.

When the target demodulation signal is generated, the demodulation unit of the demodulation process unit 260 demodulates the target demodulation signal including a message (Step S1310). Then, the message output unit 269 outputs the demodulated message together with a request for displaying the message to the display process unit 250 (Step S1311). Thereby, the processes of the demodulation process unit 260 is completed.

Further, in the case where two or more header-attached modulation signals are not stored in the storage area (No in Step S1305), the exclusion determination unit 266 of the demodulation process unit 260 determines whether the received header-attached demodulation signal is to be subjected to waveform comparison by the waveform comparison unit 265 (Step S1312). For example, in a case where the length of the synchronization signal is not Td [sec.], the exclusion determination unit 266 may determine to exclude the received header-attached modulation signal from target header-attached modulation signals that are to be compared.

In a case where the received header-attached demodulation signal is determined not to be a target for waveform comparison (No in Step S1312), the demodulation process unit 260 returns to the process of Step S1302.

In a case where the received header-attached demodulation signal is determined to be a target for waveform comparison (Yes in Step S1312), the waveform comparison unit 265 compares the synchronization signal included in the extraction signal with synchronization signal data 245 and obtains a matching degree based on the comparison (Step S1313). Then, the waveform comparison unit 265 determines whether the matching degree is greater than or equal to a threshold (Step S1314). Note that, although the threshold of Step S1314 may be a value greater than the threshold of Step S1308, the threshold of Step S1314 may be the same as the threshold of Step S1308.

The threshold of Step S1314 is preferred to be a value greater than the threshold of Step S1308 because the extraction signal itself is a target demodulation signal in the case of Step S1314. Therefore, the threshold of Step S1314 is preferred to be near 100%.

In a case where the matching degree is greater than or equal to the threshold (Yes in Step S1314), the demodulation process unit 260 determines the extraction signal to be the target demodulation signal and proceeds to Step S1310.

In a case where the matching degree is not greater than or equal to the threshold (No in Step S1314), the waveform comparison unit 265 compares the synchronization signal and the header information signal with the synchronization signal data 245 and the header information data 246, respectively. Then, the waveform comparison unit 265 obtains the matching degree to a part reaching to the header information signal (Step S1315).

Then, the waveform comparison unit 265 determines whether the matching degree is greater than or equal to a threshold (Step S1316). The threshold of Step S1316 may be the same as or different from the threshold of Step S1314.

In a case where the matching degree is not greater than or equal to threshold (No in Step S1316), the demodulation process unit 260 returns to Step S1302.

In a case where the matching degree is greater than or equal to the threshold (Yes in Step S1316), the demodulation process unit 260 determines that the extraction signal as a target demodulation signal and proceeds to Step S1310.

Figure 14:
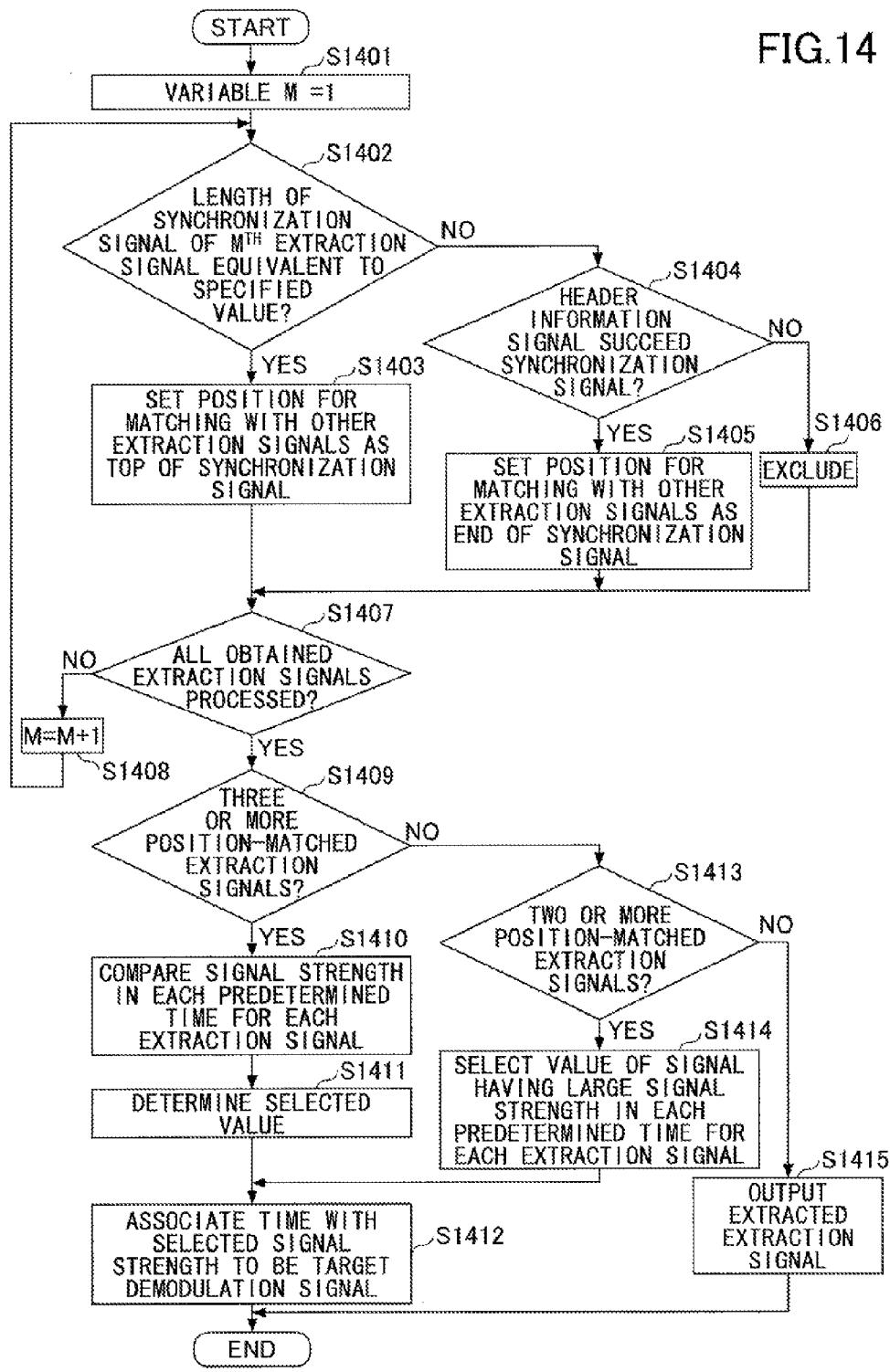
FIG. 14 is a second flowchart for describing the processes of a demodulation process unit.

Next, a process of generating the target demodulation signal is described with reference to FIG. 14. FIG. 14 is a second flowchart for describing the processes of the demodulation process unit 260. FIG. 14 depicts the details of the process performed in Step S1309 of FIG. 13.

The demodulation process unit 260 of the first embodiment sets the value of a variable M to 1 (M=1) (Step S1401). Then, the position matching unit 270 of the signal generation unit 267 determines whether the length of the synchronization signal included in the $M^{th}$ extraction signal is Td seconds (Step S1402). In a case where the length of the synchronization signal is Td seconds (Yes in Step S1402), the position matching unit 270 performs position matching on the $M^{th}$ extraction signal, so that a reference position used when superimposing the $M^{th}$ extraction signal with another extraction signal is set to a top (start point) of the synchronization signal (Step S1403). Then, the demodulation process unit 260 proceeds to the below-described Step S1407.

In a case where the length of the synchronization signal is less than Td seconds (No in Step S1402), the position matching unit 270 determines whether a header information signal is continuing at an end point of the synchronization signal (Step S1404).

In a case where a header information signal is continuing at the end point of the synchronization signal (Yes in Step S1404), the position matching unit 270 performs position matching on the $M^{th}$ extraction signal, so that a reference position used when superimposing the $M^{th}$ extraction signal with another extraction signal is set to the end point of the synchronization signal (Step S1405). Then, the demodulation process unit 260 proceeds to the below-described Step S1407.

In a case where a header information signal is not continuing at the end point of the synchronization signal (No in Step S1404), the signal generation unit 267 of the demodulation process unit 260 excludes the $M^{th}$ extraction signal so that the excluded $M^{th}$ extraction signal is not used as a target modulation signal (Step S1406).

Then, the signal generation unit 267 determines whether the processes of Step S1402 to Step S1406 have been performed on all of the obtained extraction signals (Step S1407). That is, in Step S1407, the signal generation unit 267 determines whether the reference position used when superimposing the extraction signals have been decided (set) for all of the obtained extraction signals.

In a case where the processes of Step S1402 to Step S1406 have not been performed on all of the obtained extraction signals (No in Step S1407), the signal generation unit 267 increments the variable M to "M=M+1" (Step S1408) and returns to Step S1402.

In a case where the processes of Step S1402 to Step S1406 have been performed on all of the obtained extraction signals (Yes in Step S1407), the signal generation unit 267 determines whether the position matching process has been performed on three or more extraction signals (Step S1409). In a case where the signal generation unit 267 determines that the position matching process has been performed on less than three extraction signals (No in Step S1409), the demodulation process unit 260 proceeds to the below-described Step S1413.

In a case where the signal generation unit 267 determines that the position matching process has been performed on three or more extraction signals (Yes in Step S1409), the suitable value decision unit 271 of the signal generation unit 267 superimposes each of the extraction signals and compares the signal strength at each predetermined interval time (Step S1410). Then, the suitable value decision unit 271 decides the value of the signal strength that is to be used based on the results of the comparison of Step S1410 (Step S1411).

For example, in a case where there are three or more signal strength values, the suitable value decision unit 271 may exclude a signal strength that is farthest from the other strength values and obtain the average of the strength value (except for the excluded signal strength).

Then, the signal generation unit 267 generates a target modulation signal associated with a predetermined time and the selected signal strength (Step S1412).

In a case where the signal generation unit 267 determines that the position matching process has not been performed on three or more extraction signals (No in Step S1409), the signal generation unit 267 determines whether the position matching process has been performed on two or more extraction signals (Step S1413). In a case where the signal generation unit 267 determines that the position matching process has not been performed on two or more extraction signals (No in Step S1413), the demodulation process unit 260 proceeds to Step S1415.

In a case where the signal generation unit 267 determines that the position matching process has been performed on two or more extraction signals (Yes in Step S1413), the suitable value decision unit 271 of the signal generation unit 267 compares the signal strengths of two extraction signals of a predetermined time. Then, the suitable value decision unit 271 decides that the value of the larger signal strength of the two extraction signals is to be used (Step S1414). Then, the demodulation process unit 260 proceeds to Step S1412.

In a case where the signal generation unit 267 determines that the position matching process has not been performed on two or more extraction signals (i.e., the position matching process only being performed on a single extraction signal) (No in Step S1413), the signal generation unit 267 outputs the single extraction signal as the target demodulation signal (Step S1415).

Figure 15A:
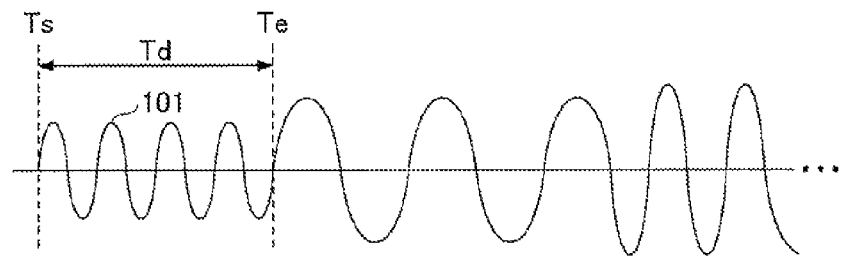
FIGS. 15A to 15D are schematic diagrams for describing the processes of a position matching unit.
Figure 15B:
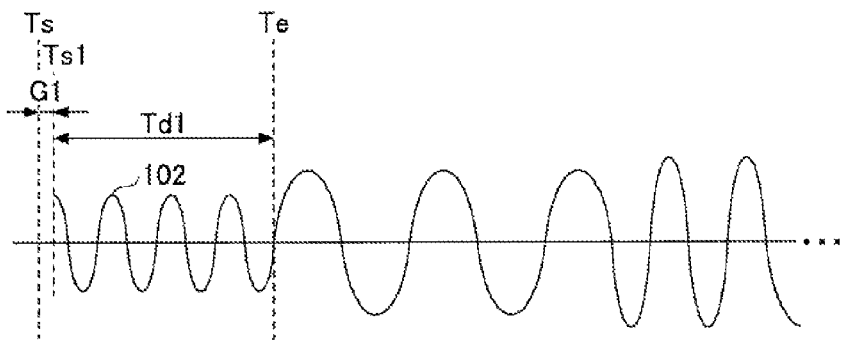
Figure 15C:
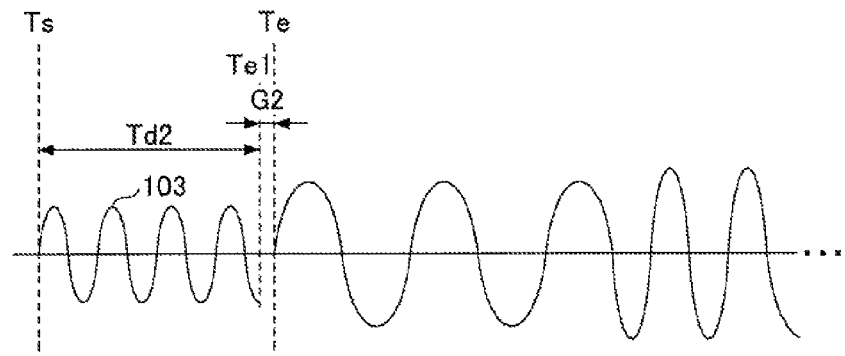
Figure 15D:
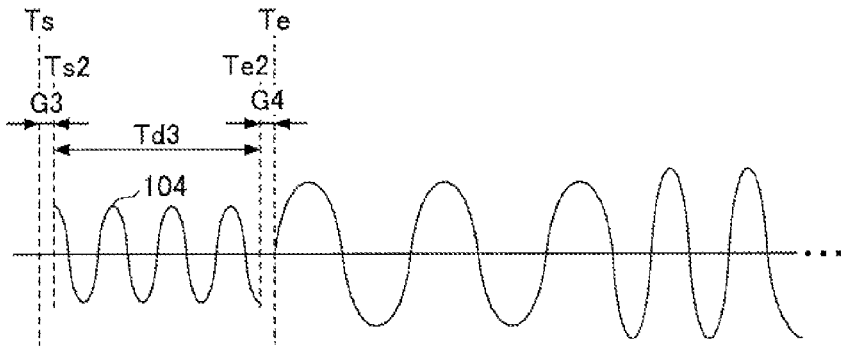

Next, the processes of the position matching unit 270 are described with reference to FIGS. 15A to 15D. FIGS. 15A to 15D are schematic diagrams for describing the processes of the position matching unit 270. FIG. 15A depicts an example of a synchronization signal having a predetermined length of Td seconds. FIGS. 15B, 15C, and 15D depict examples where the synchronization signal is shorter than the predetermined length Td.

The length of time of the synchronization signal 101 of FIG. 15A is Td seconds. The length of time Td of the synchronization signal 101 begins from a time Ts when a start point of the synchronization signal 101 is received and ends at a time Te when an end point of the synchronization signal 101 is received.

The length of time of the synchronization signal 102 of FIG. 15B is Td1 seconds. The length of time Td1 begins from a time Ts1 when a start point of the synchronization signal 102 is received and ends at a time Te when an end point of the synchronization signal 102 is received. The length of time Td1 of the synchronization signal 102 is shorter than the length of time Td of the synchronization signal 101. FIG. 15B indicates that the synchronization signal 102 was not received during a period G1 beginning from the time Ts and ending at the time Ts1.

The length of time of the synchronization signal 103 of FIG. 15C is Td2 seconds. The length of time Td2 begins from a time Ts when a start point of the synchronization signal 103 is received and ends at a time Te1 when an end point of the synchronization signal 103 is received. The length of time Td1 of the synchronization signal 103 is shorter than the length of the time Td of the synchronization signal 101. FIG. 15C indicates that the synchronization signal 103 was not received during a period G2 beginning from the time Te1 and ending at the time Te.

The length of time of the synchronization signal 103 of FIG. 15D is Td3 seconds. The length of time Td3 begins from a time Ts2 when a start point of the synchronization signal 104 is received and ends at a time Te2 when an end point of the synchronization signal 104 is received. The length of time Td3 of the synchronization signal 104 is shorter than the length of time of the synchronization signal 101. FIG. 15D indicates that the synchronization signal 104 was not receiving during a period G3 beginning from the time Ts and ending at a time Ts1 and during a period G4 beginning from the time Te2 and ending at the time Te.

In a case where the synchronization signal included in the $M^{th}$ extraction signal is the synchronization signal 101, the length of the synchronization signal 101 included in the $M^{th}$ extraction signal is the predetermined value (Td seconds). Therefore, the position matching unit 270 of the first embodiment sets the start point of the synchronization signal 101 as the reference position that is used when superimposing the $M^{th}$ extraction signal with another extraction signal.

Further, in a case where the synchronization signal included in the $M^{th}$ extraction signal is the synchronization signal 102, the length of the synchronization signal 102 included in the $M^{th}$ extraction signal is not the predetermined value (Td seconds). Therefore, the position matching unit 270 of the first embodiment determines whether a header information signal continues from the rear of the synchronization signal 102. Because a header information signal is received in continuation from the synchronization signal 102 at the time Te of receiving the end point of the synchronization signal, the position matching unit 270 sets the end point of the synchronization signal 102 as the reference position that is used when superimposing the $M^{th}$ extraction signal with another extraction signal.

Further, in a case where the synchronization signal included in the $M^{th}$ extraction signal is the synchronization signal 103, the length of the synchronization signal 103 included in the $M^{th}$ extraction signal is not the predetermined value (Td seconds). Therefore, the position matching unit 270 of the first embodiment determines whether a header information signal continues from the rear of the synchronization signal 103. Because there is a period G2 in which no signal is received following the synchronization signal 103, no header information signal continues from the synchronization signal 103.

In this case, the position matching unit 270 cannot determine whether the synchronization signal 103 is an independent signal or a part of an extraction signal. Therefore, the position matching unit 270 excludes the extraction signal including the synchronization signal 103 from the extraction signals to be used for the signal generation process.

Further, the synchronization signal 104 is handled in a similar manner as the synchronization signal 103. That is, in a case where the synchronization signal included in the $M^{th}$ extraction signal is the synchronization signal 104, the length of the synchronization signal 104 included in the $M^{th}$ extraction signal is not the predetermined value (Td seconds) and a period G4 in which no signal is received follows the synchronization signal 104. Therefore, the position matching unit 270 cannot determine whether the synchronization signal 104 is an independent signal or a part of an extraction signal. Accordingly, the position matching unit 270 excludes the extraction signal including the synchronization signal 104 from the extraction signals to be used for the signal generation process.

Thus, according to the above-described embodiment, when a part of a synchronization signal is disarranged (disordered), whether the synchronization is to be used for a signal generation process is determined depending on the manner of the disarrangement.

Figure 16A:
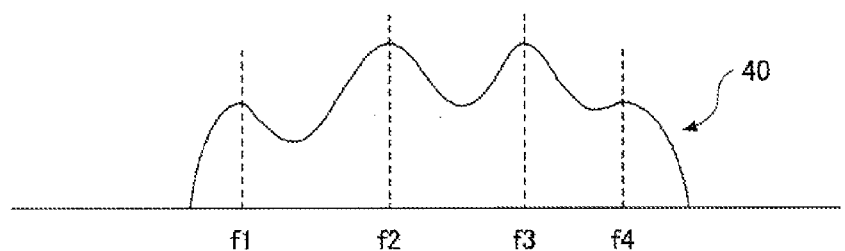
FIGS. 16A and 16B depict an example where an extraction signal is extracted from a header-attached modulation signal transmitted from a transmitter.
Figure 16B:
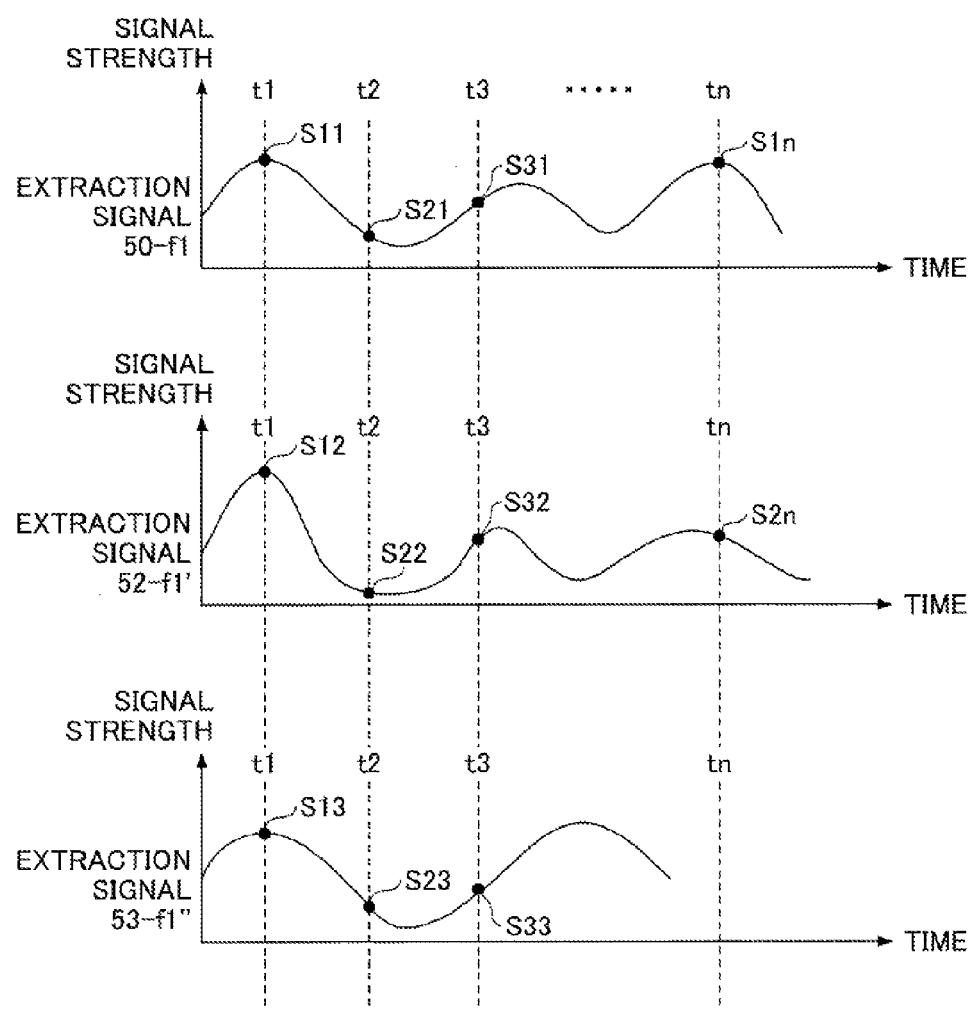

Next, the processes of the suitable value decision unit 271 are described with reference to FIGS. 16A and 16B. FIGS. 16A and 16B are schematic diagrams for describing the processes of the suitable value decision unit 271.

FIGS. 16A and 16B depict an example where an extraction signal 50 is extracted from a header-attached modulation signal 40 transmitted from the transmitter 300-1. FIG. 16A is a schematic diagram for describing the header-attached modulation signal 40 received by the data processing apparatus 200. FIG. 16B is a schematic diagram for describing the deciding of a selected value.

In the example of FIG. 16A, the header-attached modulation signal 40 that includes a synchronization signal and a header information signal is obtained by modulating each carrier wave of four frequencies f1, f2, f3, and f4. That is, the header-attached modulation signal 40 includes a header-attached modulation signal 40-f1 of frequency f1, a header-attached modulation signal 40-f2 of frequency f2, a header-attached modulation signal 40-f3 of frequency f3, and a header-attached modulation signal 40-f4 of frequency f4. A message signal is divided into four parts and transmitted by superimposing the four header-attached modulation signals 40-f1, 40-f2, 40-f3, and 40-f4 included in the header-attached modulation signal 40.

Similarly, in another example, a header-attached modulation signal 42 transmitted from the transmitter 300-2 includes a header-attached modulation signal 42-f1' of frequency f1, a header-attached modulation signal 42-f2' of frequency f2, a header-attached modulation signal 42-f3', and a header-attached modulation signal 42-f4'. A message signal is divided into four parts and transmitted by superimposing the four header-attached modulation signals 42-f1', 42-f2', 42-f3', and 42-f4'.

Similarly, in yet another example, a header-attached modulation signal 43 transmitted from the transmitter 300-3 includes a header-attached modulation signal 43-f1" of frequency f1, a header-attached modulation signal 43-f2" of frequency f2, a header-attached modulation signal 43-f3", and a header-attached modulation signal 43-f4". A message signal is divided into four parts and transmitted by superimposing the four header-attached modulation signals 43-f1", 43-f2", 43-f3", and 43-f4".

In the first embodiment, the transmitters 300-1, 300-2, and 300-3 divide the message signal by using the same method (technique).

In the example of FIG. 16B, a target demodulation signal is generated by using an extraction signal 50-f1 extracted from the header-attached modulation signal 40-f1 of frequency f1, an extraction signal 52-f1' extracted from the header-attached modulation signal 42-f1' of frequency f1', an extraction signal 53-f1" extracted from the header-attached modulation signal 43-f1" of frequency f1".

The suitable value decision unit 271 of the first embodiment superimposes the three extraction signals and compares the signal strengths of a predetermined time unit.

The term "predetermined time unit" refers to a unit of time of a resolution corresponding to a modulation rate. For example, in a case of an extraction signal that is modulated 10 times in 1 second, the predetermined time unit is 0.1 seconds.

In the example of FIG. 16B, the value of the signal strength of the extraction signal 50-f1 at the time t1 is S11, the value of the signal strength of the extraction signal 52-f1' at the time t1 is S12, and the value of the signal strength of the extraction signal 53-f" at the time t1 is S13.

The suitable value decision unit 271 compares the values S11, S12, and S13 of the signal strengths and determines whether each of the signal strengths values are substantially the same.

More specifically, the suitable value decision unit 271 compares the value S11 and the value S12 and determines whether the difference between the values S11 and S12 is within a predetermined range. Then, the suitable value decision unit 271 compares the value S11 and the value S13 and determines whether the difference between the values S11 and S13 is within a predetermined range. Then, the suitable value decision unit 271 compares the value S12 and the value S13 and determines whether the difference between the values S12 and S13 is within a predetermined range.

In a case where all of the differences resulting from the comparison are within a predetermined range, the suitable value decision unit 271 decides the largest value among the values S11-S13 is to be the value of the signal strength at the time t1.

Alternatively, in a case where there is a combination of values S11-S13 whose difference does not fall within the predetermined range, only the values whose difference falls within the predetermined range may be compared and the larger one of the compared values may be decided to be the value of the signal strength at the time t1.

Alternatively, the suitable value decision unit 271 may obtain the average of the values having differences falling within the predetermined range and decide the average be the value of the signal strength at the time t1.

Similarly, the suitable value decision unit 271 of the first embodiment decides a value of a signal strength suitable for each time unit. That is, the suitable value decision unit 271 decides a value of a signal strength that is suitable for the time t2 from the values S21, S22, and S23 of each of the extraction signals. Further, the suitable value decision unit 271 decides a value of a signal strength that is suitable for the time t3 from the values S31, S32, and S33 of each of the extraction signals.

Further, in a situation where there are two values S1$n$, S2$n$ of signal strengths of the extraction signals (e.g., at time tn), the suitable value decision unit 271 may decide the larger one of the two values S1$n$, S2$n$ be the suitable signal strength at the time tn.

Then, the suitable value decision unit 271 may store each decided value of the signal strength of each time unit as a target modulation signal.

For example, the suitable value decision unit 271 may store the value S11 of the signal strength of the time t1 as the target modulation signal. Similarly, the suitable value decision unit 271 may store the value S22 of the signal strength of the time t2 as the target modulation signal. The suitable value decision unit 271 may store the value S11 of the signal strength of the time t1 as the target modulation signal. Similarly, the suitable value decision unit 271 may store the value S22 of the signal strength of the time t2 as the target modulation signal. Similarly, the suitable value decision unit 271 may store the value S22 of the signal strength of the time t2 as the target modulation signal. Further, the suitable value decision unit 271 may store the value S31 of the signal strength of the time t3 as the target modulation signal. Further, the suitable value decision unit 271 may store the value S1$n$ of the signal strength of the time tn as the target modulation signal.

Similarly, the suitable value decision unit 271 performs the above-described processes on the extraction signals extracted from the header-attached modulation signals 40-$f$2, 42-$f$2', 43-$f$2" and generates a target demodulation signal. Further, the suitable value decision unit 271 performs the above-described processes on the extraction signals extracted from the header-attached modulation signals 40-$f$3, 42-$f$3', 43-$f$3" and generates a target generation signal.

Hence, according to the first embodiment, a target demodulation signal is generated and demodulated by performing a process of receiving header-attached modulation signals including the same message signal from multiple transmitters 300, extracting the message signals from the header-attached modulation signals, generating the target demodulation signal prior to demodulating the message signals, and demodulating the target demodulation signal. Therefore, with the first embodiment, a target demodulation signal having a waveform similar to a message signal superimposed on a carrier wave can be generated. Thus, the accuracy of information obtained from wireless signals can be improved.

Figure 17:
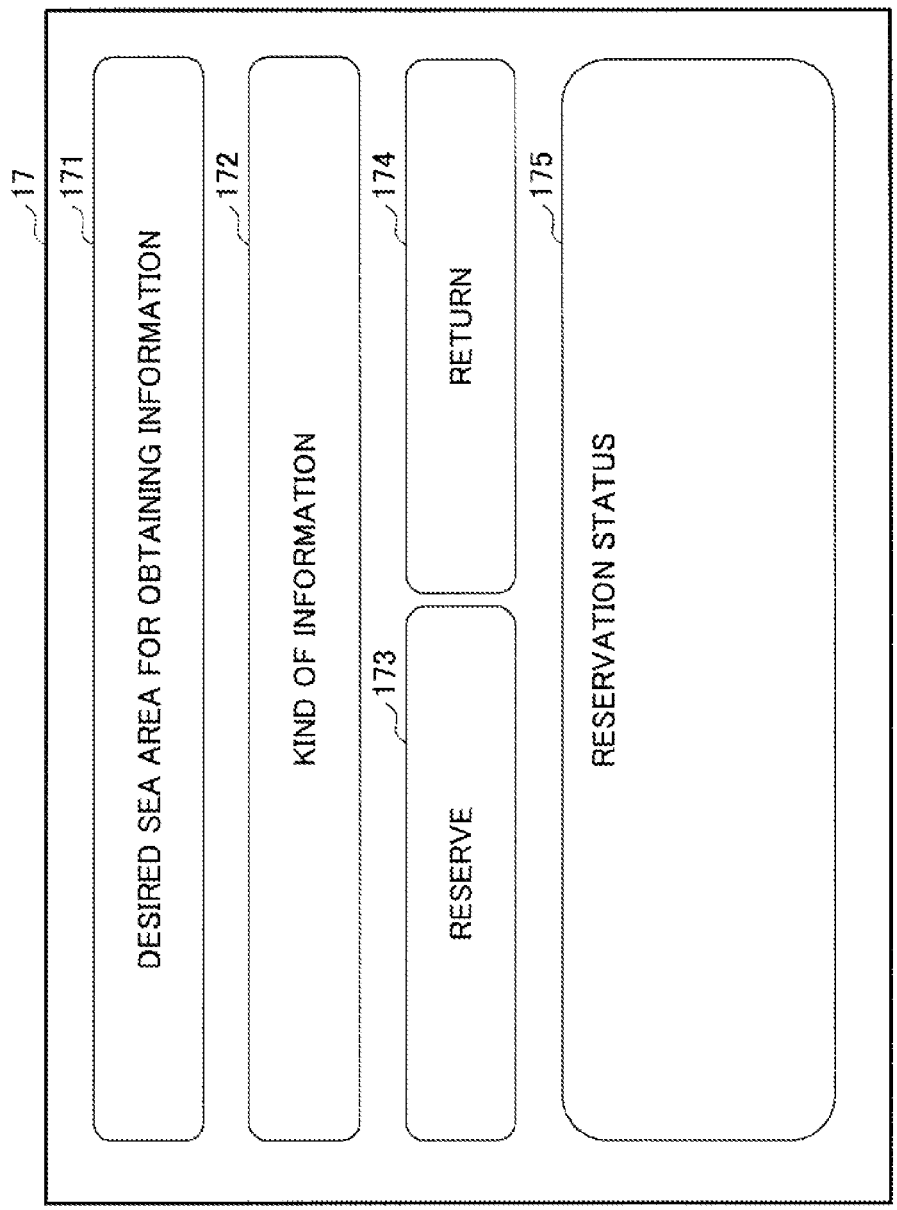
FIG. 17 is a schematic diagram illustrating a first example of a setting screen for reception reservation.

Next, a display of the information process apparatus 200 according to the first embodiment of the present invention is described. FIG. 17 is a schematic diagram illustrating a first example of a setting screen 17 for reception reservation.

The setting screen 17 of FIG. 17 is displayed on, for example, the information process apparatus 200. For example, the display control unit 254 displays the setting screen 17 on a display of the information process apparatus 200 when the communication process unit 230 is activated.

The setting screen 17 includes buttons 171 to 175. The button 171 is for switching the setting screen 17 to a screen for selecting a sea area from which information is desired to be obtained. The button 172 is for switching the setting screen 17 to a screen for selecting the type of information. The button 173 is for setting a reservation for receiving a header-attached modulation signal. The button 174 is for switching the setting screen 17 to an initial screen. The button 175 is for switching the setting screen 17 to a screen displaying the status of reception reservation.

Figure 18:
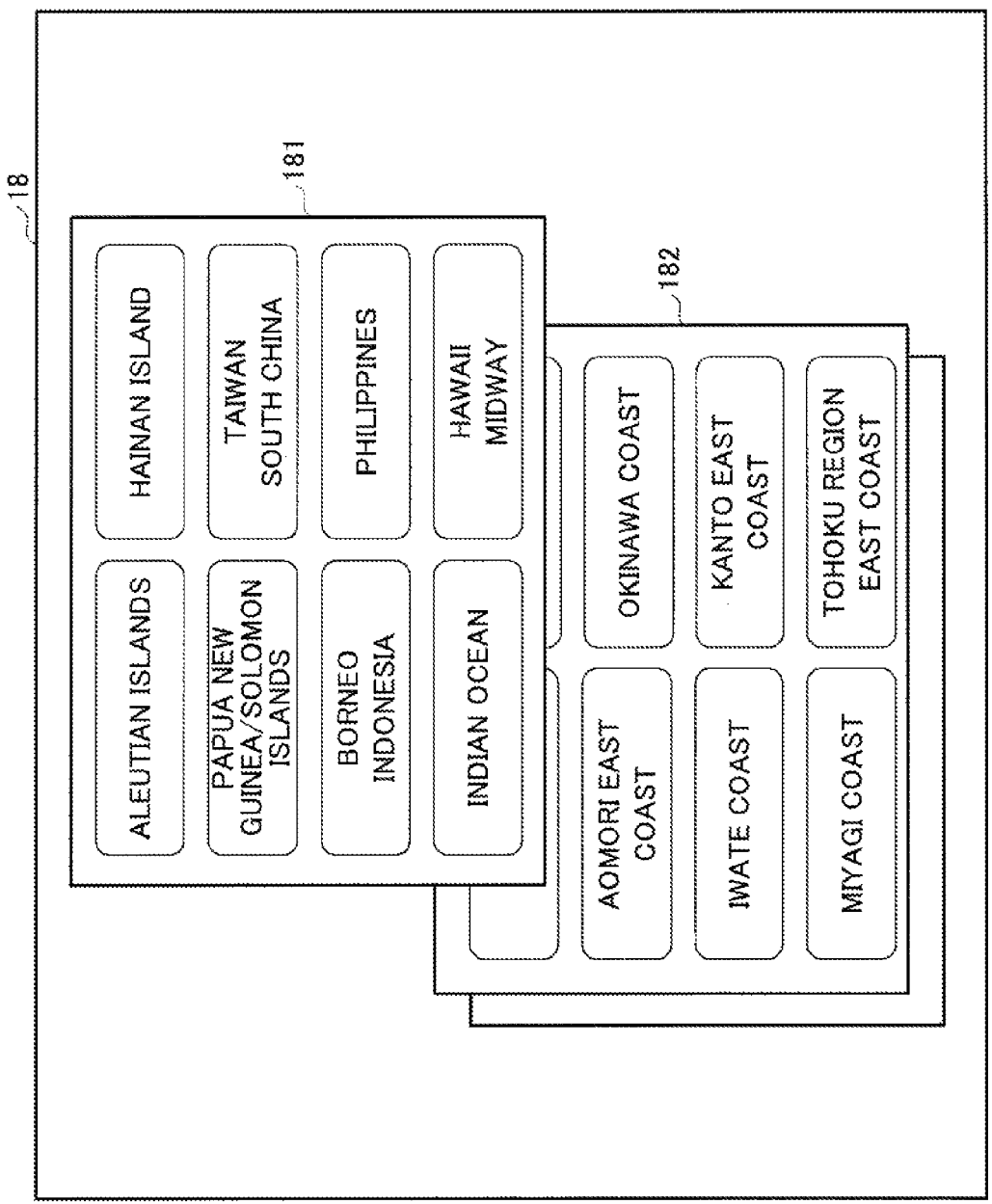
FIG. 18 is a schematic diagram illustrating an example of a screen for selecting a sea area.

FIG. 18 is a schematic diagram illustrating an example of a screen 18 for selecting a sea area. The setting screen 17 is switched to the screen 18 of FIG. 18 when the button 171 of the setting screen 17 is selected.

The screen 18 includes panels 181 and 182 for enabling a sea area to be selected. The panels 181 and 182 include buttons for selecting a sea area.

When a sea area displayed on the screen 18 is selected via the input accepting unit 251, the information process apparatus 200 of the first embodiment identifies the transmission station 3 that transmits information of the selected sea area. Note that the information process apparatus 200 may be stored with a table containing sea areas associated with transmission stations 3 that transmit information of the sea areas.

Figure 19:
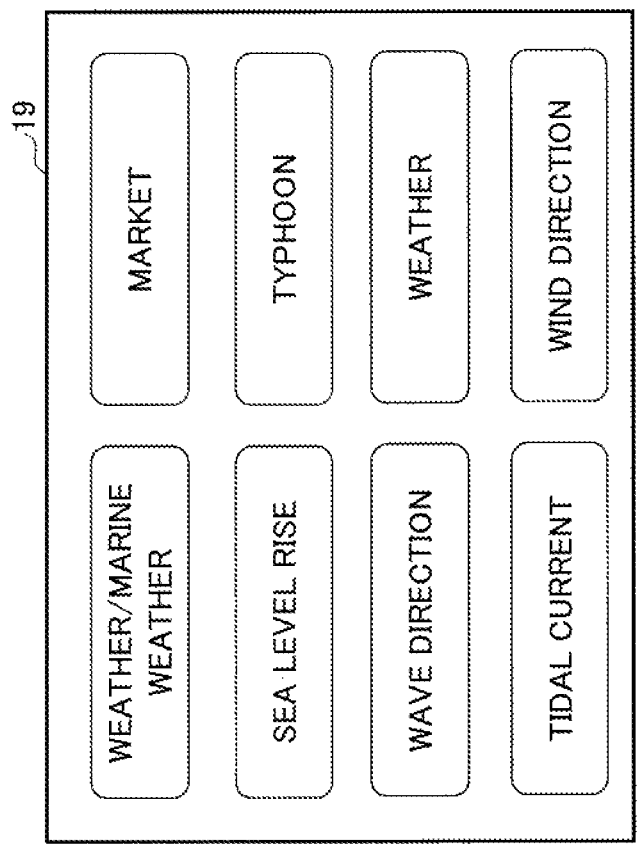
FIG. 19 is a schematic diagram illustrating an example of a screen for selecting the type of information.

FIG. 19 is a schematic diagram illustrating an example of a screen 19 for selecting the type of information. The screen 19 of FIG. 19 displays buttons for selecting the type of information.

When the input accepting unit 251 receives selection of the type of information, the reservation setting unit 252 of the information process apparatus 200 identifies information (e.g., frequency, time period) for allowing a message of the selected type of information to be transmitted by the transmission station 3 identified by the selection made with the screen 18 of FIG. 18. Then, the reservation setting unit 252 generates the reception reservation table 242.

For example, in a case where a button "Okinawa coast" of the screen 18 is selected and a button "typhoon" of the screen 19 is selected, the reservation setting unit 252 identifies the frequency of the carrier wave for transmitting typhoon information of the Okinawa coast along with the time period for transmitting the typhoon information and stores the identified information in the reception reservation table 242.

FIG. 20 is a schematic diagram illustrating an example of a setting screen 17A for displaying a reservation status. In the setting screen 17A, information 175A indicating a reservation status is displayed in an area where the button 175 was displayed in the setting screen 17 of FIG. 17. Further, a screen 176 for selecting whether to displaying a message is displayed in the setting screen 17A. A message indicating the completion of receiving typhoon information 1 is displayed in the screen 176. When a button 177 of the screen 176 for displaying a message is selected, the information process apparatus 200 displays a message. Further, when a button 178 of the screen 176 for not displaying a message is selected, the display control unit 254 terminates the displaying of the screen 176.

FIG. 21 is a schematic diagram illustrating an example of the setting screen 17A displaying information 175A indicating the reservation status. The information 175A indicating the reservation status includes items such as "type of message", "transmission station (transmitting source)", "present time", "reception completion date", "reception completion time", "reception status", and "size of received data".

The information 175A indicating the reservation status is displayed based on the reception management table". Therefore, the information 175A indicating the reservation status changes along with the passing of time.

In the example of FIG. 21, the message "typhoon information 1" is an extraction signal extracted from a header attached modulation signal transmitted from a meteorological agency. It can be understood that the reception of "typhoon information 1" is completed 12:01 in the afternoon of Mar. 21, 2015.

Hence, with the information process apparatus 200 of the first embodiment, a corresponding message of a superimposed header-attached modulation signal can be automatically received and demodulated, and displayed by simply setting the information "sea area" and the "type of information (message)".

Further, with the first embodiment, a target modulation signal can be generated and modulated by extracting extraction signals from multiple header-attached modulation signals transmitted from different transmission stations at different time periods and superimposing the extraction signals.

Accordingly, with the first embodiment, desired information (message) can be received by performing a simple operation. Further, the accuracy of information obtained from wireless signals can be improved.

Second Embodiment

Next, the second embodiment of the present invention is described with reference to the accompanying drawings. The second embodiment is different from the first embodiment in that an information process apparatus including the demodulation process unit 269 demodulates header-attached modulation signals received by multiple reception stations. Accordingly, only this difference with the first embodiment is described. Thus, in the second embodiment, like parts/components are denoted with like reference numerals as the reference numerals of the first embodiment and are not further explained.

FIG. 22 is a schematic diagram for describing a configuration of a communication system according to the second embodiment of the present invention.

The communication system 100A of the second embodiment includes an information process apparatus 200A, and receivers 500-1 to 500-$n$.

The information process apparatus 200A of the second embodiment receives wireless signals transmitted from communication apparatuses 600-1 to 600-$n$ via the receivers 500-1 to 500-$n$. The information process apparatus 200A extracts extraction signals from each of the wireless signals and generates a target demodulation signal. Then, the information process apparatus 200A transmits the generated target demodulation signal to, for example, a terminal device connected to a network or the like connected to the information process apparatus 200A. Note that the terminal device 700 may be a typical information process apparatus including an arithmetic processor and a memory. Accordingly, the information process apparatus 200A of the second embodiment functions as a demodulation server.

In the following, the receivers 500-1 to 500-$n$ may be collectively referred to as "receiver 500" when the receivers 500-1 to 500-$n$ are not particularly distinguished from each other. Further, the communication apparatuses 600-1 to 600-$n$ may be collectively referred to as "communication apparatus 600" when the communication apparatuses 600-1 to 600-$n$ are not particularly distinguished from each other.

In the second embodiment, the communication apparatus 600 and the receiver 500 perform wireless communication using multiple carrier waves of different frequencies (multiband wireless communication).

The communication apparatuses 600-1 to 600-$n$ of the second embodiment transmit superimposed modulation signals indicating a predetermined message at a predetermined time based on the transmission schedule table stored beforehand in the communication apparatuses 600-1 to 600-$n$. That is, communication apparatuses 600-1 to 600-$n$ of the second embodiment transmit header-attached modulation signals including superimposed signals including the same message at different timings.

When the information process apparatus 200A of the second embodiment receives header-attached modulation signals from the communication apparatus 600 via the receiver 500, the information process apparatus 200A stores the header-attached modulation signals in correspondence with each type of message in the signal database 220. Then, the information process apparatus 200A obtains the header-attached modulation signals of each type of message, extracts extraction signals including message signals from multiple header-attached modulation signals, and generates a target demodulation signal.

The target demodulation signal transmitted from the information process apparatus 200A to the terminal device 700 may be demodulated at the terminal device 700. Alternatively, the target demodulation signal may be demodulated at the information process apparatus 200A and a message resulting from the demodulation by the information process apparatus 200A may be transmitted from the information process apparatus 200A to the terminal device 700.

Further, the information process apparatus 200A of the second embodiment may function as a reception station 800 that receives wireless signals from the communication apparatus 600 by being connected to the receiver 500.

Figure 23:
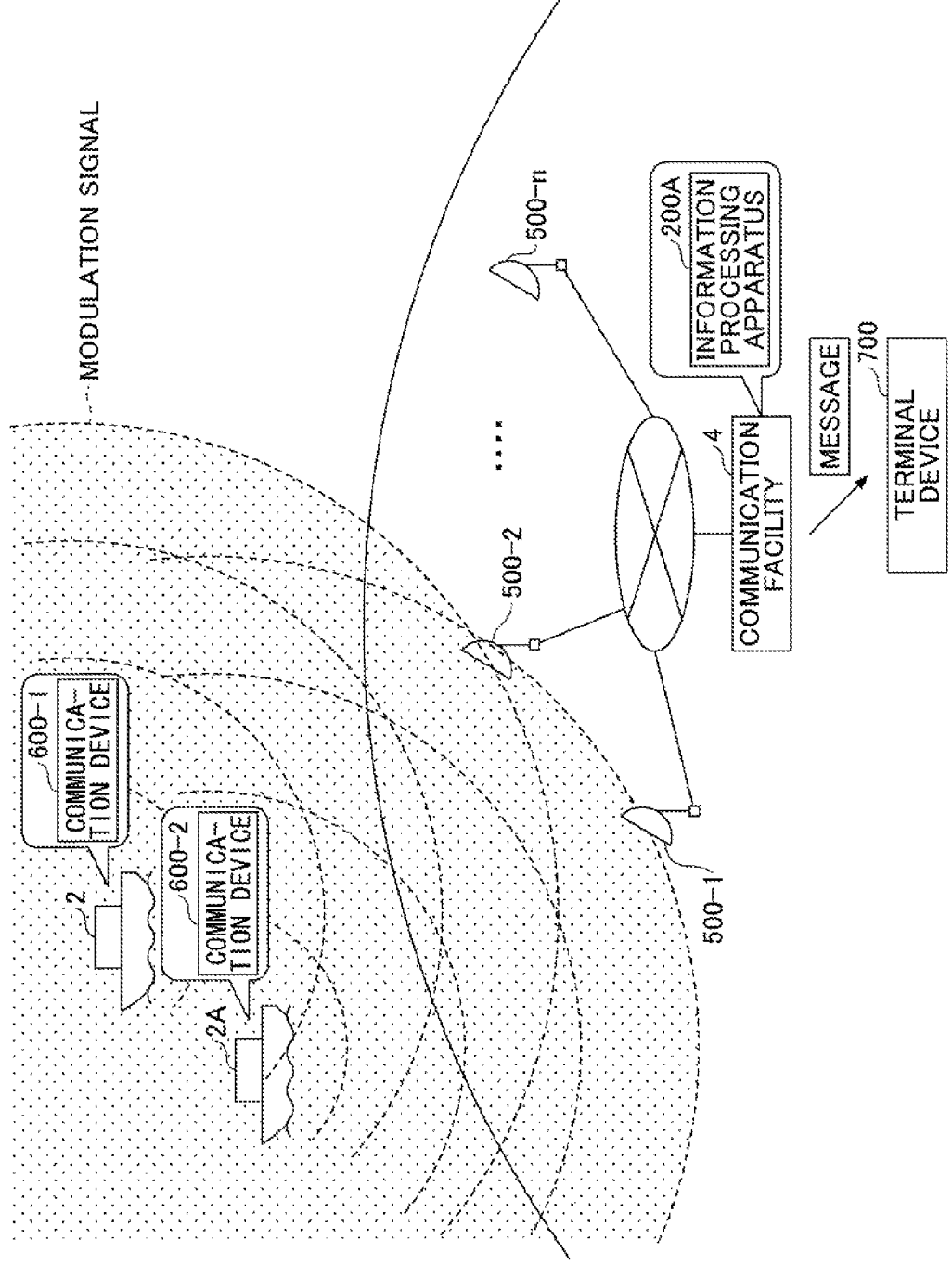
FIG. 23 is a schematic diagram for describing an example of using the communication system of the second embodiment.

Next, the communication performed by using the communication system 100A of the second embodiment is described with reference to FIG. 23. FIG. 23 is a schematic diagram for describing an example of using the communication system 100A of the second embodiment.

The communication system 100A of the second embodiment may be applied to, for example, communication performed between the ships 2, 2A located in the sea and the reception station 500 located on land.

The communication apparatus 600-1 may be mounted on the ship 2 and the communication apparatus 600-2 may be mounted on the ship 2A, so that the communication apparatuses 600-1, 600-2 can transmit a predetermined message at a predetermined time period. The information process apparatus 200A may be placed on, for example, a communication facility located on land.

In the example of FIG. 23, when header-attached modulation signals are transmitted from the communication apparatus 600, the header-attached modulation signals reach the land by being reflected from the ionosphere, the earth surface, and the sea surface. When the information process apparatus 200A receives the header-attached modulation signals reaching the land via the receiver 500, the information process apparatus 200A stores the header-attached modulation signals in the signal database 220.

In this situation, the information process apparatus 200A does not always receive all of the header-attached modulation signals transmitted by the communication apparatus 600 at a single time. In the example of FIG. 23, the information process apparatus 200A illustrates a case where the information process apparatus 200A receives the header-attached modulation signals transmitted from the communication apparatus 600-1 and a portion of the header-attached modulation signals transmitted from the communication apparatus 600-2 is received by the information process apparatus 200A via the receiver 2.

Figure 24:
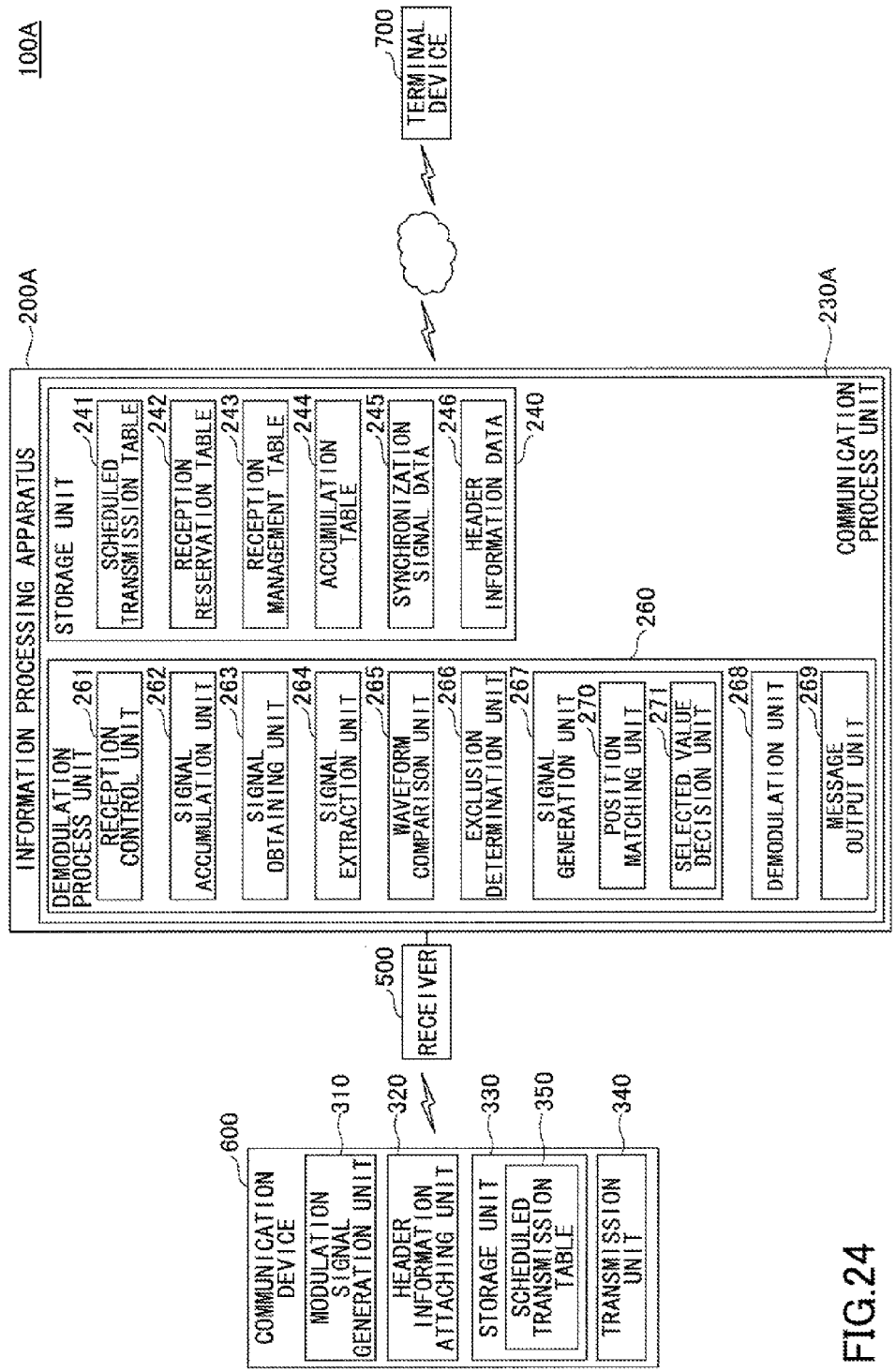
FIG. 24 is a schematic diagram illustrating the functions of each unit included in the communication system of the second embodiment.

FIG. 24 is a schematic diagram illustrating the functions of each unit included in the communication system of the second embodiment.

The communication apparatus 600 of the second embodiment includes a modulation signal generation unit 610, a header information attaching unit 620, a storage unit 630, and a transmitting unit 640.

Each of the modulation signal generation unit 610, the header information attaching unit 620, the storage unit 630, and the transmitting unit 640 are the same as the modulation signal generation unit 310, the header information attaching unit 320, the storage unit 330, and the transmitting unit 640 of the transmitter 300 of the first embodiment. Therefore, further explanation of the modulation signal generation unit 610, the header information attaching unit 620, the storage unit 630, and the transmitting unit 640 is omitted.

The information process apparatus 200A of the second embodiment includes a communication process unit 230A. The communication process unit 230A is the same as the communication process unit 230 of the first embodiment except that the display process unit 250 is not included in the communication process unit 230A.

Note that the display process unit 250 may be provided in the terminal device 700 in the second embodiment. Therefore, in the information process apparatus 200A of the second embodiment, the reception reservation table 242 may be generated based on the content that is set to the terminal device 700.

Further, the demodulation process unit 260 of the second embodiment may transmit a target demodulation signal to the terminal device 700 after the target demodulation signal is generated. Alternatively, the demodulation process unit 260 may transmit a message resulting from the demodulation of the target demodulation signal to the terminal device 700.

In the demodulation process unit 260 of the second embodiment, it may be determined beforehand on whether to transmit the target demodulation signal or the message to the terminal device 700. For example, in a case where the terminal device 700 does not have a demodulation function, the demodulation process unit 260 may transmit the result of demodulating the target demodulation signal (demodulating result) to the terminal device 700. Alternatively, in a case where the terminal device 700 does not have a demodulation function, the demodulating process unit 260 may transmit a message resulting from the demodulating to the terminal device 700.

Hence, with the second embodiment, the accuracy of information obtained from wireless signals can be improved by extraction signals including multiple header-attached modulation signals and superimposing the extracted signals in a case where, for example, the same message is transmitted at different timings.

Although the second embodiment is explained by referring to a case where the communication apparatus 600 is mounted on a ship, the second embodiment is not limited to this case. For example, the communication apparatus 600 of the second embodiment may be located in a mountain area. The area for placing the communication apparatus 600 of the second embodiment is may be land or sea. That is, the position for placing the communication apparatus 600 is not limited in particular.

With the second embodiment, the multiple receivers 500 are allocated in multiple areas. However, a single receiver 500 may be connected to the information process apparatus 200A.

Hence, with the above-described embodiments of the present invention, the accuracy of information obtained from wireless signals can be improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium on which a program is recorded for causing a processor to execute a demodulation process, the demodulation process comprising:
   detecting a preamble of a wireless signal transmitted from a first transmission station by way of a short wavelength carrier wave;
   extracting a first signal superimposed on the short wavelength carrier wave, the first signal being extracted from the wireless signal that is identified in accordance with the detection of the preamble;
   extracting a second signal superimposed on a carrier wave transmitted from a second transmission station different from the first transmission station; and
   performing demodulation on a target demodulation signal obtained by superimposing the first signal on the second signal.

2. The non-transitory computer-readable recording medium as claimed in claim 1,
   wherein the demodulation process further comprises:
   referring to a storage unit that stores types of the first signal in association with combinations of a transmission start time of the wireless signal and a frequency of the short-wave carrier wave; and
   storing the first signal in a database with respect to each of the types of the first signal associated with the combinations of the transmission time of the wireless signal included in the preamble;
   wherein the demodulation includes superimposing same types of signals extracted from the wireless signals.

3. The non-transitory computer-readable recording medium as claimed in claim 2,
   wherein the superimposing includes
   comparing signal strengths of the first signal with respect to each predetermined time,
   obtaining a signal strength in accordance with the comparison, and
   generating a target demodulation signal that is subjected to demodulation in accordance with the signal strength of the first signal with respect to each predetermined time, and
   wherein the demodulation includes demodulating the target demodulation signal.

4. The non-transitory computer-readable recording medium as claimed in claim 3, wherein the superimposing includes generating the target demodulation signal in accordance with a largest signal strength among the signal strengths of the first signal with respect to each predetermined time.

5. The non-transitory computer-readable recording medium as claimed in claim 3, wherein the superimposing includes generating the target demodulation signal in accordance with an average strength among the signal strengths of the first signal with respect to each predetermined time.

6. The non-transitory computer-readable recording medium as claimed in claim 3,
wherein the preamble includes a characteristic signal included in the wireless signal,
wherein the signal extracted by the extracting includes the characteristic signal, and
wherein the demodulation does not include demodulating the characteristic signal in a case where the characteristic signal includes a disordered part.

7. The non-transitory computer-readable recording medium as claimed in claim 6,
wherein the superimposing further includes superimposing an ordered part of the characteristic signal instead of superimposing the disordered part of the characteristic signal.

8. The non-transitory computer-readable recording medium as claimed in claim 6,
wherein the characteristic signal includes a synchronization signal having a frequency that continues for a predetermined period.

9. The non-transitory computer-readable recording medium as claimed in claim 8,
wherein the demodulation includes comparing the synchronization signal and a waveform data of the synchronization signal stored in the storage unit, and
wherein the synchronization signal is determined as the target demodulation signal in a case where a matching degree between the synchronization signal and the waveform data is greater than or equal to a predetermined value.

10. The non-transitory computer-readable recording medium as claimed in claim 8,
wherein the demodulation includes determining that a start point of the synchronization signal is a reference position of the superimposing in a case where the synchronization signal continues for the predetermined period,
wherein the first signal is not superimposed in a case where the synchronization signal does not continue for the predetermined period and is not followed by a header information signal.

11. A demodulation method comprising:
detecting a preamble of a wireless signal transmitted from a first transmission station by way of a short wavelength carrier wave;
extracting a first signal superimposed on the short wavelength carrier wave, the first signal being extracted from the wireless signal that is identified in accordance with the detection of the preamble;
extracting a second signal superimposed on a carrier wave transmitted from a second transmission station different from the first transmission station; and
performing demodulation on a target demodulation signal obtained by superimposing the first signal on the second signal.

12. An information process apparatus comprising:
a processor; and
a memory that stores a program, the program causes the processor to execute a demodulation process including
detecting a preamble of a wireless signal transmitted from a first transmission station by way of a short wavelength carrier wave;
extracting a first signal superimposed on the short wavelength carrier wave, the first signal being extracted from a wireless signal that is identified in accordance with the detection of the preamble;
extracting a second signal superimposed on a carrier wave transmitted from a second transmission station; and
performing demodulation on a target demodulation signal obtained by superimposing the first signal on the second signal.

13. A non-transitory computer-readable recording medium on which a program is recorded for a causing a processor to execute a demodulation process, the demodulation process comprising:
detecting a preamble of a wireless signal transmitted from a first communication station by way of a short wavelength carrier wave;
extracting a first signal superimposed on the short wavelength carrier wave, the first signal being extracted from the wireless signal that is identified in accordance with the detection of the preamble;
extracting a second signal superimposed on a carrier wave transmitted from a second communication station different from the first communication station;
performing demodulation on a target demodulation signal obtained by superimposing the first signal on the second signal; and
transmitting the target demodulation signal to an information process apparatus.

14. A demodulation method comprising:
detecting a preamble of a wireless signal transmitted from a first communication station by way of a short wavelength carrier wave;
extracting a first signal superimposed on the short wavelength carrier wave, the first signal being extracted from the wireless signal that is identified in accordance with the detection of the preamble;
extracting a second signal superimposed on a carrier wave transmitted from a second communication station different from the first communication station;
performing demodulation on a target demodulation signal obtained by superimposing the first signal on the second signal; and
transmitting the target demodulation signal to an information process apparatus.

15. An information process apparatus comprising:
a processor configured to execute a program in accordance with the demodulation method of claim 14.

16. An information process apparatus comprising:
a processor that causes a computer to execute a demodulation process including
detecting a preamble of a wireless signal transmitted from a first transmission apparatus by way of a short-wavelength carrier wave;
extracting a first signal superimposed on the carrier wave, the signal extracted from a wireless signal specified in accordance with the detection of the preamble; and
performing demodulation by superimposing the extracted first signal on a second signal;
wherein the second signal is extracted from a wireless signal transmitted from a second transmission apparatus and superimposed on a carrier wave by the second transmission apparatus.

17. A reception station comprising:
a processor; and
a memory that stores a program, the program causes the processor to execute a process including detecting a preamble of a wireless signal transmitted from a first communication station by way of a short wavelength carrier wave;

extracting a first signal superimposed on the short wavelength carrier wave, the first signal being extracted from the wireless signal that is identified in accordance with the detection of the preamble;

extracting a second signal superimposed on a carrier wave transmitted from a second communication station different from the first communication station, performing demodulation on a target demodulation signal obtained by superimposing the first signal on the second signal; and outputting the target demodulation signal to an information process apparatus.

* * * * *